(12) United States Patent
Tonelli et al.

(10) Patent No.: US 9,414,711 B2
(45) Date of Patent: Aug. 16, 2016

(54) COFFEE MACHINE

(75) Inventors: Stefano Tonelli, Gaggio Montano (IT);
Cristiano Castelli, Porretta Terme (IT)

(73) Assignee: KONINKLIJKE PHILIPS N.V.,
Eindhoven (NL)

( * ) Notice: Subject to any disclaimer, the term of this patent is extended or adjusted under 35 U.S.C. 154(b) by 1044 days.

(21) Appl. No.: 13/123,540

(22) PCT Filed: Aug. 11, 2009

(86) PCT No.: PCT/IT2009/000378
§ 371 (c)(1),
(2), (4) Date: Apr. 12, 2011

(87) PCT Pub. No.: WO2010/044116
PCT Pub. Date: Apr. 22, 2010

(65) Prior Publication Data
US 2012/0118164 A1    May 17, 2012

(30) Foreign Application Priority Data
Oct. 15, 2008   (IT) ................................ FI2008A0198

(51) Int. Cl.
*A47J 31/44* (2006.01)
*A47J 31/057* (2006.01)
*A47J 31/60* (2006.01)

(52) U.S. Cl.
CPC .............. *A47J 31/4485* (2013.01); *A47J 31/60* (2013.01)

(58) Field of Classification Search
CPC ............................. A47J 31/4485; A47J 31/60

USPC ..................... 99/293, 323.1, 302 R, 295, 300
See application file for complete search history.

(56) References Cited

U.S. PATENT DOCUMENTS

| | | | |
|---|---|---|---|
| 5,272,960 A * | 12/1993 | Kinna | 99/280 |
| 5,738,002 A | 4/1998 | Marano-Ducarne | |
| 5,862,740 A * | 1/1999 | Grossi | 99/293 |
| 6,711,987 B2 | 3/2004 | Yoakim et al. | |
| 6,713,110 B2 | 3/2004 | Imboden | |
| 6,854,381 B2 | 2/2005 | Fischer | |
| 7,021,206 B2 | 4/2006 | Eckenhausen | |
| 7,322,282 B2 | 1/2008 | Frigeri | |
| 7,651,010 B2 * | 1/2010 | Orzech et al. | 222/214 |
| 8,061,264 B2 | 11/2011 | Turpin | |
| 2002/0035929 A1 * | 3/2002 | Kanba et al. | 99/279 |
| 2006/0102010 A1 * | 5/2006 | Burrows | 99/279 |
| 2006/0174771 A1 | 8/2006 | Frigeri | |
| 2006/0174772 A1 * | 8/2006 | Frigeri | 99/279 |
| 2007/0107603 A1 * | 5/2007 | Coccia et al. | 99/275 |
| 2007/0169640 A1 * | 7/2007 | Sato et al. | 99/495 |
| 2007/0243305 A1 * | 10/2007 | Marconi | 426/596 |
| 2008/0099055 A1 * | 5/2008 | Lemley | 134/25.2 |

FOREIGN PATENT DOCUMENTS

| | | |
|---|---|---|
| EP | 0803220 | 10/1997 |
| EP | 0813834 | 12/1997 |

(Continued)

*Primary Examiner* — Tu B Hoang
*Assistant Examiner* — Michael Hoang

(57) ABSTRACT

A coffee machine having a water tank, at least one first pump, at least one first boiler for heating the water, a coffee brewing unit, and circuits to feed hot water and/or steam with a first outlet for hot water or steam towards an emulsifying device which can be connected to a connection joint of the coffee machine, a second outlet for hot water and/or wash water.

31 Claims, 16 Drawing Sheets

(56) References Cited

FOREIGN PATENT DOCUMENTS

| | | |
|---|---|---|
| EP | 1312292 | 5/2003 |
| EP | 1688074 | 8/2006 |
| EP | 1785074 | 5/2007 |
| WO | 2005074770 | 8/2005 |
| WO | 2005102126 | 11/2005 |
| WO | 2006122916 | 11/2006 |
| WO | 2008050366 | 8/2008 |

* cited by examiner

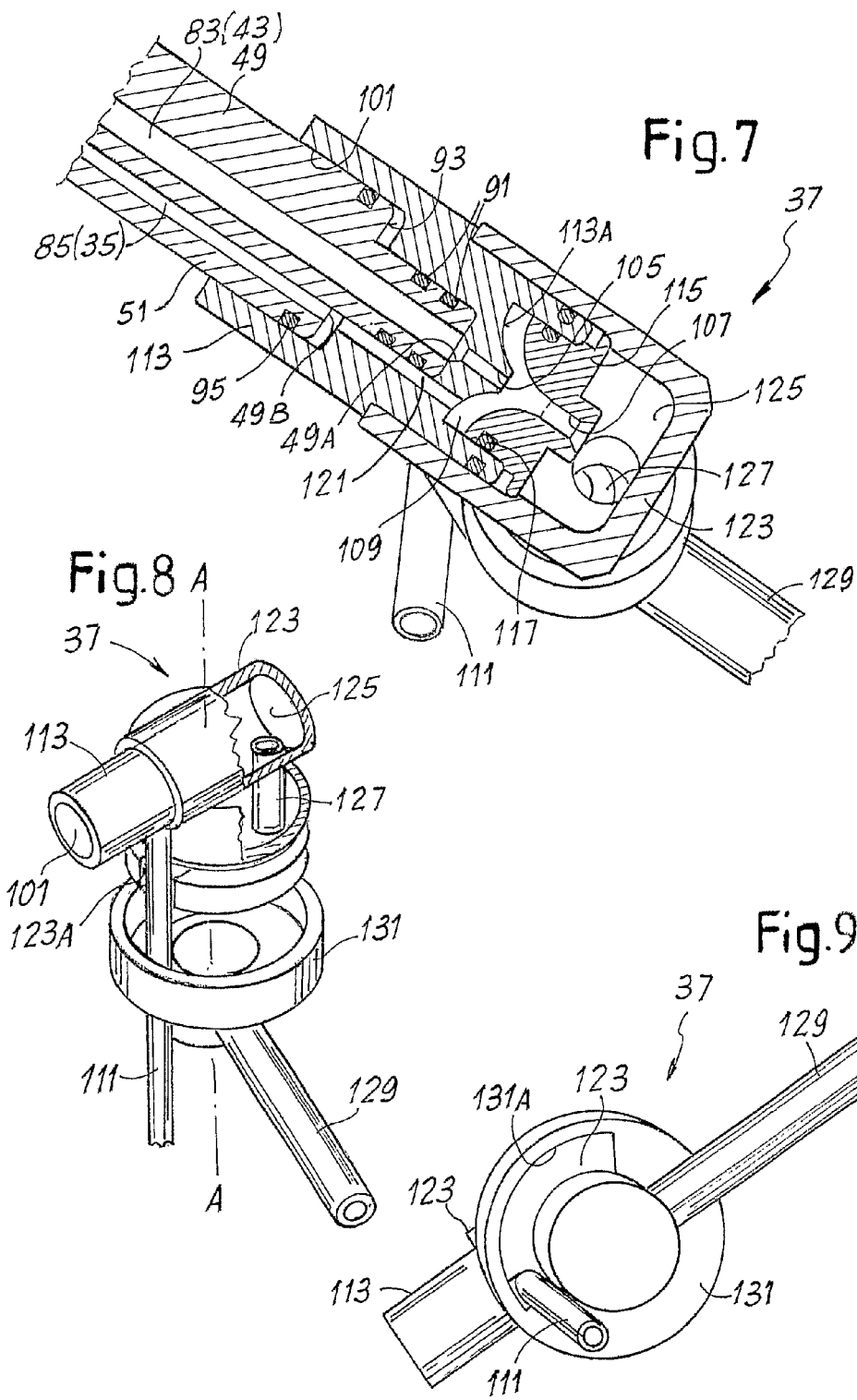

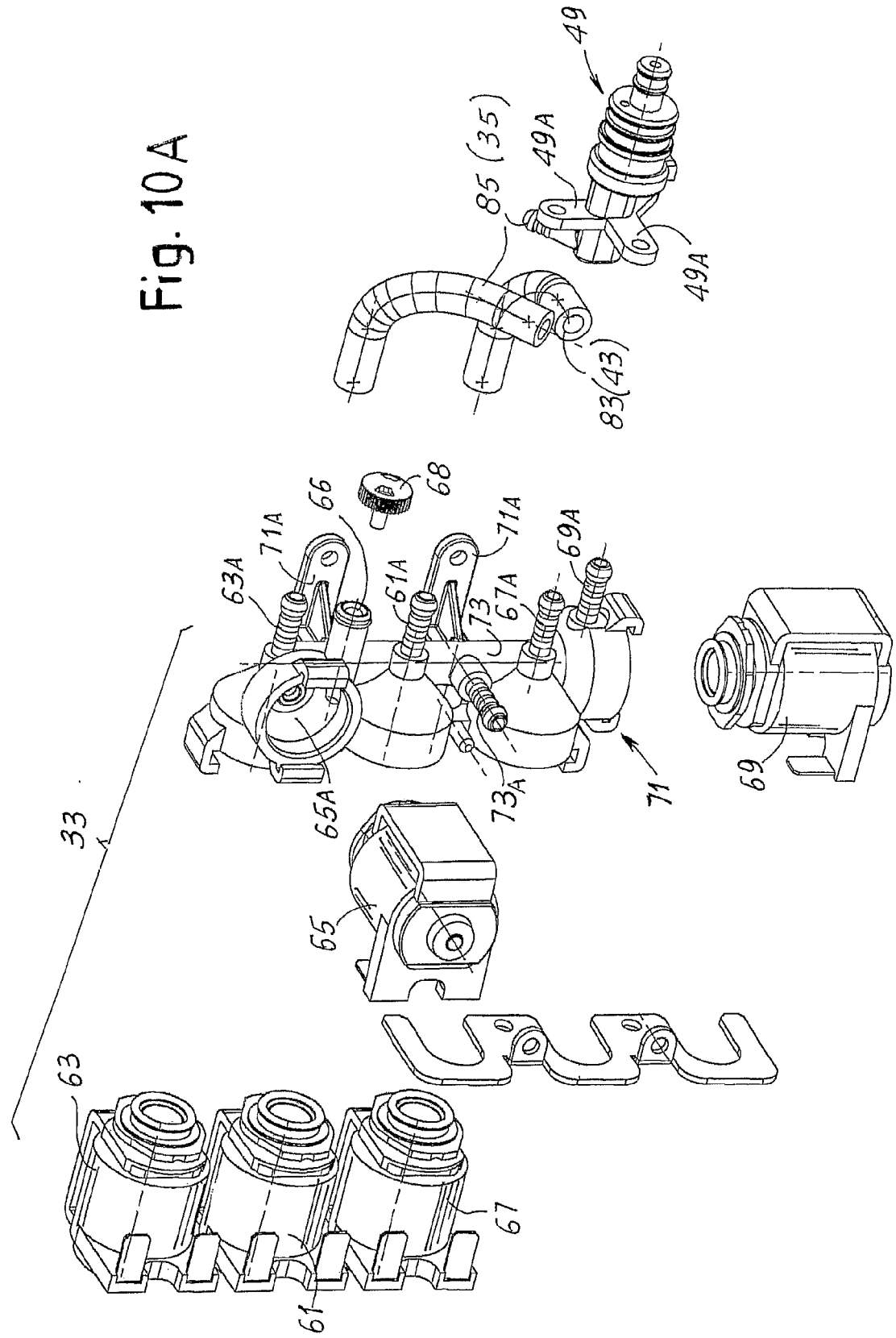

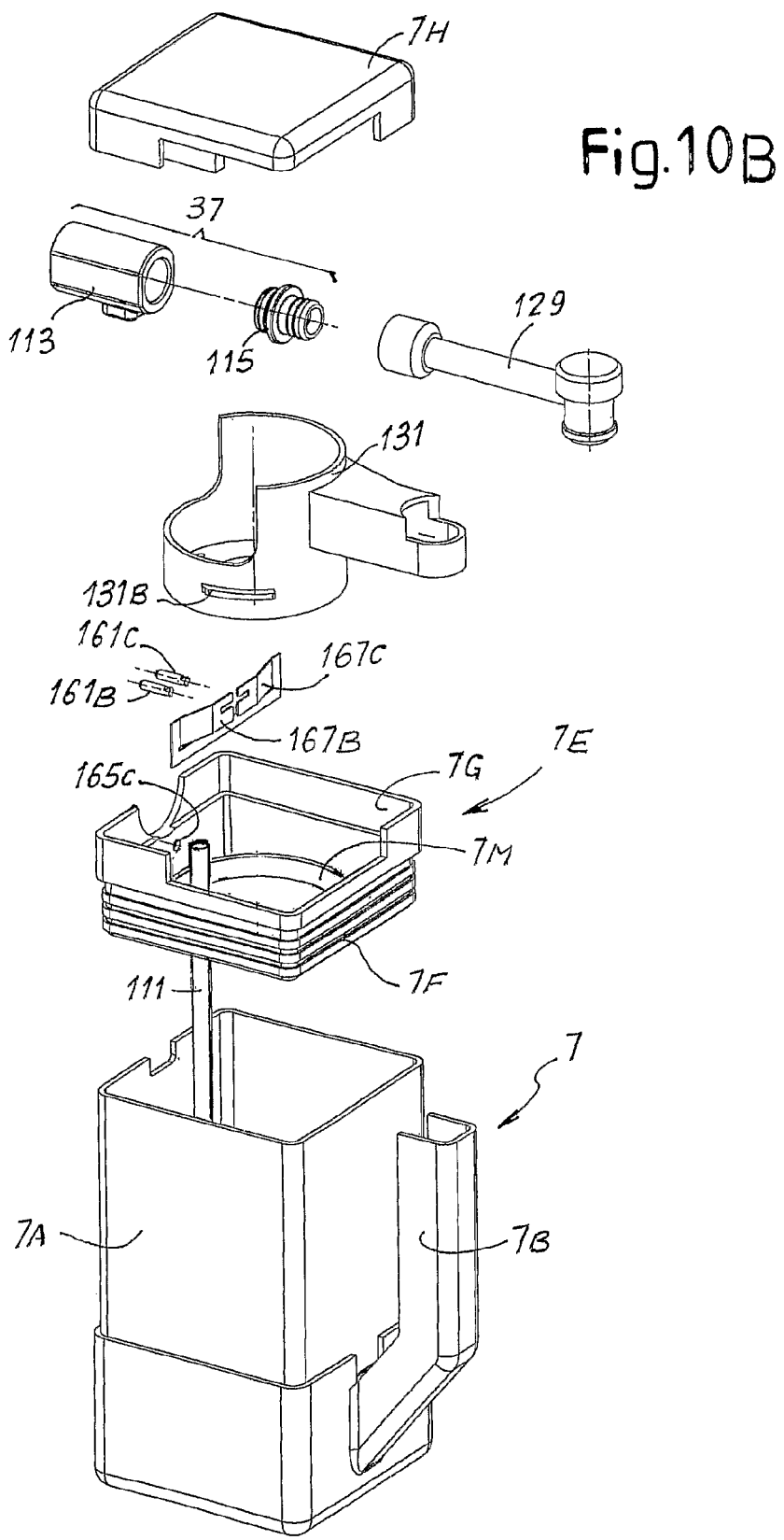

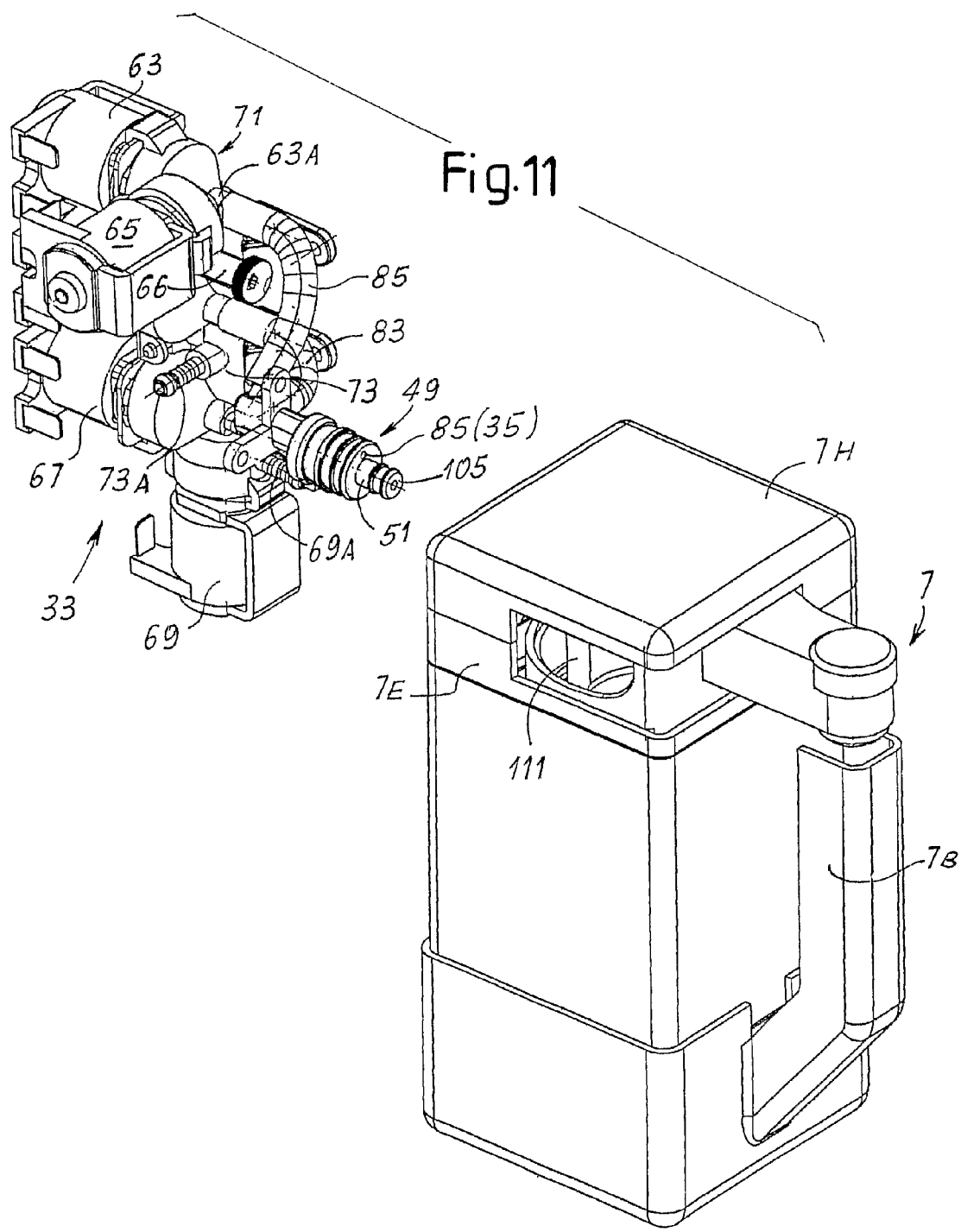

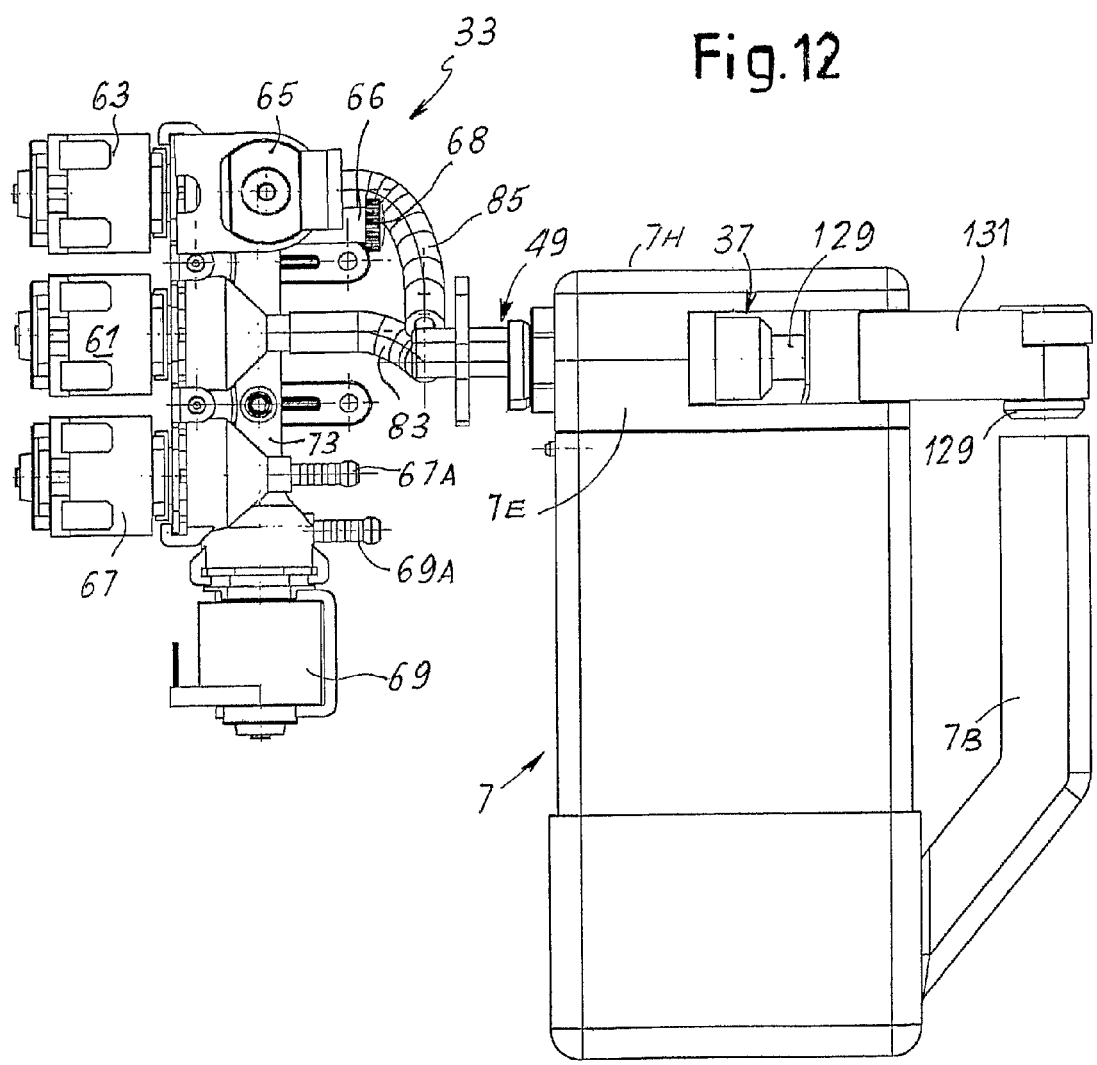

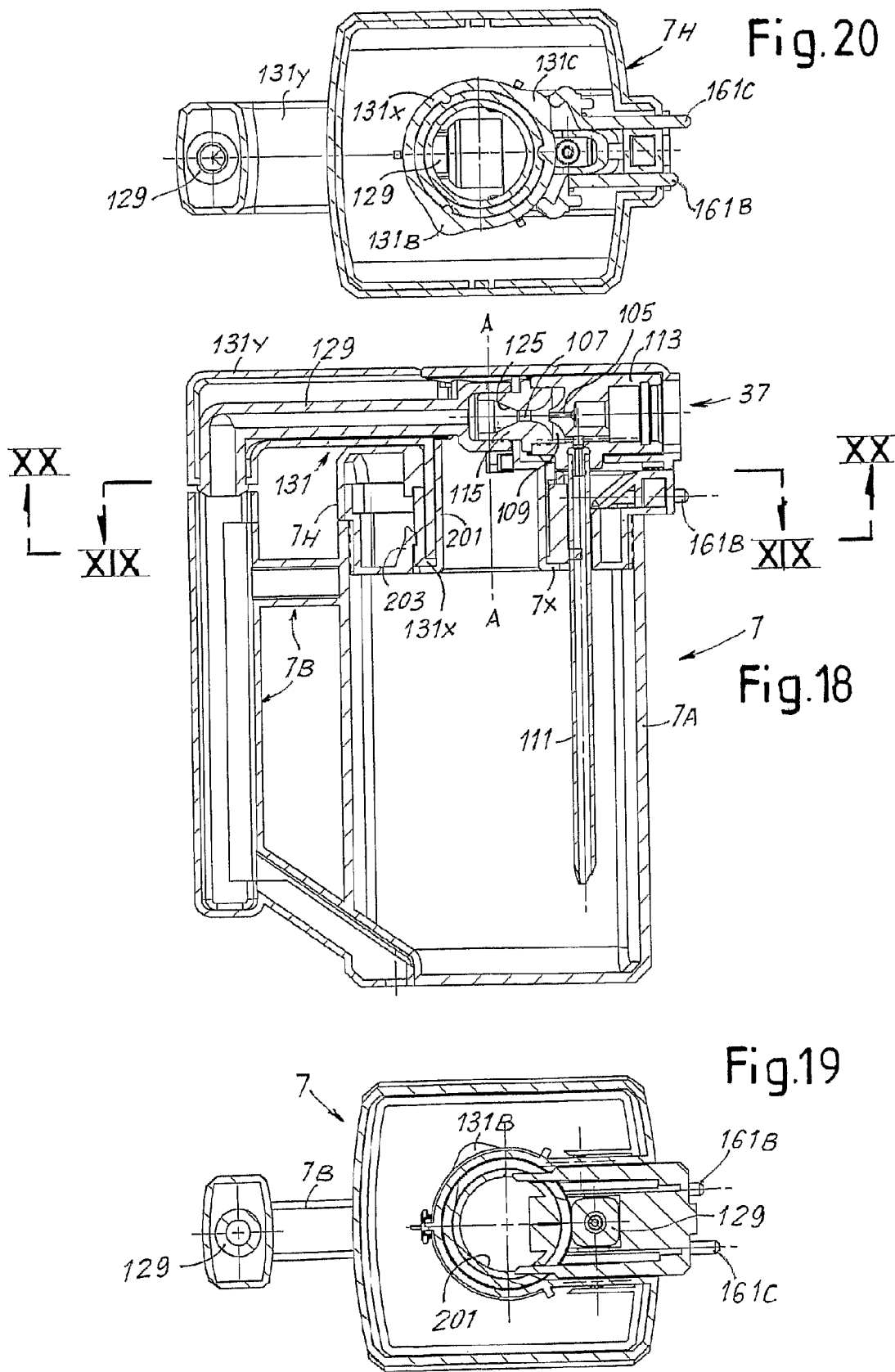

COFFEE MACHINE

TECHNICAL FIELD

The present invention relates to the machines for producing coffee, and in particular to automatic or semi-automatic machines for producing coffee provided with accessories for frothing milk or other beverages.

STATE OF THE ART

Recently machines have been developed for producing beverages, and in particular for producing espresso coffee, dedicated mainly to household use, wherein devices for generating steam and hot water are provided for producing tea, for heating water or milk, for frothing milk in order to produce latte macchiato, cappuccino or similar beverages.

US-A-2006/0174771 and EP-A-1688074 (SAECO) disclose for example a emulsifying device, coupled with a container for containing milk, to be incorporated in a coffee machine provided with a steam generator for the emulsifying device. The container is inside the coffee machine and the emulsifying device is controlled so as to generate an emulsion of milk and air which comes out from a nozzle so as to be supplied directly into a cup. More in particular, the emulsifying device comprises an air suction hole, a steam inlet and a milk suction duct. The steam passes through a Venturi tube and causes, by generating a suction pressure, the suction of the milk from the milk container arranged in the coffee machine. By opening or closing the air suction hole, milk froth (emulsified milk) or simply hot milk is generated. In order to drain the device and to wash a part of the ducts, a relief valve is provided, which is opened thus allowing the passage of steam or hot water through the Venturi tube, without creating the suction required to suck the milk. The device is particularly efficient, but it has some limits as regards the cleaning of the circuits, as not all the ducts affected by the milk flow can be adequately washed. Furthermore, it is not possible to obtain a correct cleaning of the air suction duct which, due to its small dimension, is subjected to clogging. This problem is worsened by the fact that the air suction hole is arranged near the milk suction duct.

WO-A-2008050366 (SAECO) discloses another type of emulsifying device housed inside the coffee machine, provided with means for controlling the opening and closing of the air inlet valve and with a relief system for discharging the milk at the end of the emulsifying cycle.

EP-A-803220 discloses another emulsifying device for producing milk froth, which can be coupled to a coffee machine.

U.S. Pat. No. 7,322,282 discloses an emulsifying device similar to that disclosed in the US-A-2006/0174771, but provided with a nanoparticle coating of the areas that will be in contact with the milk, in order to obtain a greater hygiene of the machine.

WO-A-2006/122916 (SAECO) discloses an outer unit which can be coupled with a coffee machine and onto which a carafe can be arranged for producing frothed milk or hot milk. This is generated by injecting steam produced by the coffee machine. The steam in injected from the bottom of the carafe upwards, so as to reach a mixing chamber contained in the lid of the carafe. The milk is sucked from the bottom of the carafe under the effect of the suction generated by the steam, and it comes out of the emulsifying device so as to be poured again in the carafe. The milk is therefore heated and/or frothed whilst it remains in its container.

U.S. Pat. No. 6,711,987 discloses a coffee machine with a steam outlet which can be introduced on the upper end of a lid of a carafe inside which the steam is injected for emulsifying or heating milk. A similar arrangement is disclosed in U.S. Pat. No. 6,854,381, which relates to a similar system for connecting a dispensing nozzle for dispensing steam or hot water to a carafe, inside which milk froth can be produced. Another type of emulsifying device is disclosed in U.S. Pat. No. 5,738,002.

WO-A-2005/102126 discloses a system comprising a coffee machine with a steam outlet which can be coupled to a carafe, in the lid of which an emulsifying device is contained, through which it is possible to produce milk froth by sucking the milk contained in the carafe. The froth is supplied through a dispensing nozzle outside the carafe, with conceptually the same solution as disclosed in U.S. Pat. No. 6,711,987.

These devices have critical aspects connected with the hygiene of the machine and of any accessory thereof, both in the case in which they are provided for producing froth by sucking from a milk container housed in the machine or outside the machine for supply the froth into a cup, as well as in the case in which they are intended for directly emulsifying the milk inside a carafe inside which the cold milk is contained.

Actually, the emulsifying device in which mixing of milk and steam or of milk, steam and air (depending whether hot milk or frothed milk must be produced) as well as the ducts associated to the emulsifying device come into contact with the milk whilst using the machine and, if they are non correctly washed, this can result in the formation of deposits or accumulation of milk residues wherein bacteria or other health-harmful microorganisms can proliferate.

For this reason systems and devices have been studied in order to reduce the accumulation of milk residues in the emulsifying device and in the ducts deriving from it.

However, notwithstanding the efforts to solve this problem, an efficient solution thereof, allowing a full cleaning of the emulsifying device and in general of all the areas which come into contact with the milk, has not been found.

Furthermore, the machines and the accessories, in particular the carafes, intended for the use in combination with these machines often have complex structural characteristics and therefore critical aspects as regards the easy use, the production cost and/or the resistance and the reliability of the parts and of the components.

SUMMARY OF THE INVENTION

According to one aspect, the present invention provides a coffee machine of the type comprising: a water tank; at least one first pump to feed a first boiler for heating the water; a brewing unit for preparing coffee; and circuits to feed hot water and/or steam, with a first outlet for hot water and/or steam towards an emulsifying device which can be connected to a connection joint of the coffee machine for producing hot milk or frothed milk; wherein it is possible to obtain a better cleaning of the emulsifying device and/or of other accessories which can be interfaced to the machine and intended to come into contact with the milk to be heated or frothed.

Substantially, according to one embodiment of the invention, to the above mentioned first hot water and/or steam outlet a second hot water and/or steam outlet is associated towards the emulsifying device, for washing the suction chamber, the mixing nozzle and all the other parts of the emulsifying device which come into contact with the milk.

Substantially, the invention provides for the steam generated by the machine to exit from two supply points, or along two distinct paths, towards the emulsifying device so as to be used alternatively as fluid to heat and/or emulsify the milk, or as a cleaning fluid. With respect to the known machines an arrangement of this type has the substantial advantage of flushing, with the steam or with hot water coming from the boiler of the machine, all the circuits and the parts of the emulsifying device, which can be interfaced with the machine, that come into contact with the milk during operation. This guarantees an optimum cleaning without the need of using complex scraping members or other similar arrangements provided in some machines of the prior art. In some embodiments, automatic cleaning cycles can be performed, without the need of particular interventions or maneuvering by the user.

Further advantageous features and improved embodiments of the machine according to the present invention are set forth in the appended dependent claims and shall be described in greater detail with reference to a non limiting example of embodiment of the invention.

In some embodiments, the two steam or the hot water outlets can be arranged so as to exit both preferably in the connection joint connecting to the emulsifying device, preferably in two distinct positions.

In some embodiments, the two hot water or the steam outlets are arranged so that from the first outlet the steam is injected in a mixing nozzle of the emulsifying device, and from the second outlet the steam is injected in a suction chamber of said emulsifying device. The second steam or hot water outlet can be preferably arranged in a back position relative to the first outlet (with respect to the direction of feed of the steam or of the water) in order to obtain a more efficient and complete cleaning of the circuit.

Advantageously, according to some embodiments, the joint comprises a tubular body ending with the first hot water or steam outlet and the second outlet is arranged on said joint in a back position relative to said first outlet, for example on an annular projection arranged in a back position relative to an end or appendix of the joint.

The circuit of the machine can comprise a group of valves, preferably a group of electro-valves, in order to control the steam or hot water supply selectively to said first outlet and to said second outlet, to produce hot or frothed milk and, alternatively, to carry out a wash cycle for washing said emulsifying device. The valves can be shaped or designed in different ways, and a particularly simple and efficient embodiment will be described by way of example in the following with reference to the accompanying drawings.

In order to emulsify the milk, it is necessary to suck air together with the milk and to mix air and milk in the emulsifying device, in contact with the hot steam injected under pressure in the emulsifying device. In some embodiments, the air suction duct can be arranged on the emulsifying device and it can have an inlet end in communication with the environment directly on the emulsifying device. However, according to other preferred embodiments of the invention, the duct for sucking ambient air towards the emulsifying device is arranged in the machine and ends in the connection joint between machine and emulsifying device. The air is then sucked in the emulsifying device through the connection joint for connecting the emulsifying device to the machine. To the suction hole a valve can be associated, controlled by the control unit of the coffee machine, for example an electronically controlled valve. In this way the electronic control unit of the machine can open or close the air suction valve, according to the type of beverage required by the user. This allows making the operation completely automatic, avoiding the need of acting on a manual valve to open or close the suction duct. In addition to this advantage, the arrangement of the air suction in the machine, upstream of the joint towards the emulsifying device, allows to move the air inlet hole away from the area affected by the milk flow, reducing or eliminating the risk of accumulations of milk in the air duct. The control of the opening and closing of the air suction valve can be timed, with the possibility of modifying the time of aperture of the valve in a supply cycle. This allows varying the quantity of air sucked for emulsifying the milk supplied in a cup and therefore to increase or decrease the quantity of produced froth. Whilst in the traditional emulsifying devices it is necessary to increase or decrease the cross section of passage of the air in order to increase or decrease the quantity of milk froth, according to the present invention it is possible to obtain the same regulation of the froth quantity with a control of the opening time of the valve, which is simpler and does not require the need of an air suction duct with a variable cross section. Some features, indicated above, of the air suction duct can be advantageously used also irrespective of the features of the steam and/the hot water supply circuit provided with the two supply outlets.

According to some preferred embodiments of the invention, the air flow from the suction hole towards the joint occurs inside the duct which serves for the flow of water and/or steam in the washing phase. In this way it is possible to obtain the great advantage of washing not only the milk flow circuit, but also the air inlet circuit.

In some embodiments, the air suction duct towards the emulsifying device ends in said joint adjacent to the second hot water or steam outlet. In other embodiments of the present invention, the air suction duct towards the emulsifying device ends in a hot water or steam duct in fluid connection with the second hot water or steam outlet. In this case the joint has only two outlets: one outlet for hot water or steam to heat or emulsify the milk, a second outlet to supply washing hot water or steam, or alternatively air for emulsifying the milk. In this way a more efficient washing of the device is possible, with also the possibility of flushing the air suction duct, which is usually constituted by a gauged hole with smallest diameter, subject to clogging due to the impurities present in the ambient air.

In some advantageous embodiments, the machine comprises a micro-switch which enables the supply of hot water or steam through the first outlet. In some advantageous embodiments, the machine comprises a further micro-switch which enables the supply of hot water or steam through the second outlet. This allows enabling the production of hot milk or milk froth and the washing cycle, depending upon the positioning, in two distinct positions, of the emulsifying device.

Washing can be carried out in an automatic or controlled manner, at the end of each supply cycle or only or also upon request by the user. In both cases, it is possible to provide for the washing cycle to be carried out by supplying steam and/or hot water through the second outlet, or through both the second outlet and the first outlet. Preferably, washing can be performed by supplying steam and/or hot water through the second outlet for a first time interval and through the first and the second outlet for a subsequent time interval or vice versa. Preferably, the first time interval is longer than the second time interval. By washing in two time phases or intervals, it is possible to obtain a deeper cleaning of the device. It is also possible to obtain overpressure conditions in the Venturi tube and therefore washing, by means of water or steam, pushed in the first portion of the milk suction duct, which is closed or partially closed during the washing cycle, if so required.

In some embodiments it is possible to provide for two washing modes: a deep washing with hot water and/or steam supply through the one or the other or both the steam outlets, having previously closed the milk suction duct; a short washing to be carried out at the end of each milk supply cycle, to be carried out without the need of closing the milk suction duct, by injecting hot water and/or steam from the first, or from the second or from both the supply outlets. The supply can be performed in both the cases with subsequent operating sequences, for example by supplying first from the outlet misaligned relative to the Venturi tube, and then from both the outlets or vice versa. The washing cycles can be factory programmed or, as the case may be, set by the user. The short washing cycle at the end of each milk supply cycle maintains the device clean, avoiding the accumulation of milk residues also between one supply and the other.

According to a different aspect, the invention relates to a emulsifying device for heating and/or frothing milk, comprising: a connector for connection to a joint of a coffee machine, a first hot water or steam inlet towards a mixing nozzle, a suction chamber connected to a milk suction duct and to the mixing nozzle, an air inlet, a duct for supplying the hot or frothed milk. The emulsifying device according to the present invention comprises advantageously a second hot water or steam inlet, arranged in the connector in such a manner that hot water or steam coming from the coffee machine through the second inlet can flow in the mixing chamber and in the nozzle of the emulsifying device, as well as in other parts, cavities or ducts designed to enter into contact with the milk, so as to make it possible to obtain an accurate and deep cleaning of the emulsifying device and of all the parts thereof coming into contact with the milk.

Further advantageous characteristics and embodiments of the emulsifying device according to the invention will be described hereunder with reference to a non-limiting embodiment and are set forth in the appended dependent claims.

In some embodiments of the invention the emulsifying device comprises: a seat for the insertion of the joint of the coffee machine, in the bottom of which said first hot water or steam inlet towards the mixing nozzle is provided; and a duct extending between said seat and said suction chamber, arranged side-by-side with said first hot water or steam inlet, for the passage of hot water or steam towards said suction chamber.

The second hot water or steam inlet can also constitute an air inlet to obtain milk frothing, air and steam or hot water being alternatively fed through said second inlet into the suction chamber.

The emulsifying device can be formed as an independent accessory, which can be applied to the machine, and be provided with a milk suction duct which is inserted in any container, for example in a milk pack. Preferably, according to some embodiments, the emulsifying device is instead associated with a carafe for containing the milk. For example it can be housed in or associated with the lid of the carafe.

In some embodiments, the emulsifying device comprises a main body in which the joint, the mixing nozzle and the suction chamber are housed. To the main body a member can be movably constrained, for closing and opening the milk suction duct, which can assume, relative to said body, at least a first position for closing the milk suction duct and a second position for opening the milk suction duct, for example by means of a rotation movement relative to said body.

In some embodiments of the present invention, the milk suction duct comprises a tube made of flexible material, and the closing and opening member is arranged and designed so as to at least partially throttle the flexible tube, hindering the milk suction or the steam entrance through said duct when the closing and opening member is in closing position.

A further subject of the present invention is a carafe for containing the milk, which can be used in combination with a coffee machine provided with a hot water and/or steam outlet and including an emulsifying device of the type described above.

Actually, the emulsifying device according to the present invention is preferably associated to a carafe for the milk, for example it can be incorporated, associated or carried by a lid of the carafe. However it is also possible to design the emulsifying device as a separate accessory, which can be interfaced to the coffee machine and provided with a milk suction duct which can be inserted in a tank not connected to the emulsifying device, for example in a small pot, in a bottle or in a milk package or other container.

A further subject of the present invention is a unit comprising a coffee machine as defined above and an emulsifying device and/or a carafe with an emulsifying device as defined above.

According to a different aspect, the invention relates to a coffee machine of the type comprising: a water tank; at least a first pump to feed a first boiler for heating the water; a brewing unit for preparing coffee; and circuits to feed hot water and/or steam, with a first hot water or steam outlet towards an emulsifying device which can be connected to a connection joint of the coffee machine for producing hot milk or frothed milk; wherein it is possible to obtain a better cleaning of the emulsifying device and/or of other accessories which can be interfaced to the machine and intended to come into contact with the milk to be heated or frothed. Characteristically, the machine can include an air suction duct to froth the milk, which is associated to the hot water or steam outlet. A valve, in particular an electronically controlled valve, preferably controlled by a programmable control unit, can be provided for selectively opening or closing the air inlet and preferably also for adjusting the opening time. A further valve, in particular an electronically controlled valve, can be provided for opening or closing the hot water and/or steam supply duct. In this way it is possible to carry out milk heating and/or emulsifying cycles, or washing cycles. A fluid connection between the hot water or steam inlet duct and the air suction duct allows washing the air suction duct, which is prone to clogging, due to its small cross section. In some embodiments the hot water and/or steam supply duct can be single, although in the preferred embodiments two water and/or the steam ducts are provided: one for cleaning and the other for milk heating and/or emulsifying. In this second case the air suction duct is preferably connected to the hot water and/or steam supply duct provided for washing the emulsifying device. Differently from other known embodiments, in which the air suction duct is associated to an emulsifying device contained in the coffee machine, in the embodiment according to the invention the air suction duct and the corresponding opening and closing valve are arranged in the coffee machine, whilst the emulsifying device is separated from the machine and can be connected to it by means of the above mentioned joint. In this way it is possible to reduce the risk of clogging of the air suction duct, as the possibility that milk debris reach the air duct is reduced.

According to a further different aspect, the invention relates to an emulsifying device for heating and/or frothing milk, comprising: a connector for connection to a joint of a coffee machine; a first hot water or steam inlet towards a mixing nozzle; a suction chamber in fluid connection with a milk suction duct and with said mixing nozzle; a duct for supplying the hot or frothed milk. Characteristically, the milk supply duct is made of a flexible material and the emulsifying device is provided with a closing and opening member which can throttle the milk suction duct reducing the cross section thereof. In this way the emulsifying device can be particularly suitable to perform washing by injecting hot water and/or steam through the suction chamber, or through the mixing nozzle or through both these components. Actually, for this purpose the milk suction duct can be throttled so as to prevent hot water from coming into the milk tank and/or to prevent milk from being sucked in the emulsifying device. This advantage can be also obtained with a single steam and/or hot water duct, usable both for washing and for heating and/or producing frothed milk. However, the emulsifying device preferably has two ducts for inserting hot water and/or steam: one for washing and one for heating and/or emulsifying the milk.

An emulsifying device of this type can be advantageously used also to set the temperature of the milk, as described below.

BRIEF DESCRIPTION OF THE DRAWINGS

The present invention will be better understood by means of the description below and the attached drawings, which show a non-restrictive embodiment of the invention. More in particular, with reference to the attached drawings:

FIG. 7 shows an enlargement of the emulsifying device inserted on the joint of the machine;

FIG. 8 shows an axonometric view of the emulsifying device;

FIG. 9 shows an axonometric bottom view of the emulsifying device;

FIGS. 10A and 10B show axonometric exploded views of a group of valves and of a carafe in a possible embodiment of the present invention;

FIG. 11 shows an axonometric view of the assembled components of FIG. 10;

FIG. 12 shows a side view of the group of valves of the carafe of FIG. 11 with the carafe connected to the group of valves;

FIG. 18 shows a section according to a vertical plane of the carafe of FIG. 17 in assembled conditions and in the washing position;

FIGS. 19 and 20 show sections according to IXX-IXX and XX-XX of FIG. 18;

DETAILED DESCRIPTION OF AN EMBODIMENT OF THE INVENTION

Embodiment of the FIGS. 1 to 9

Figure 1:
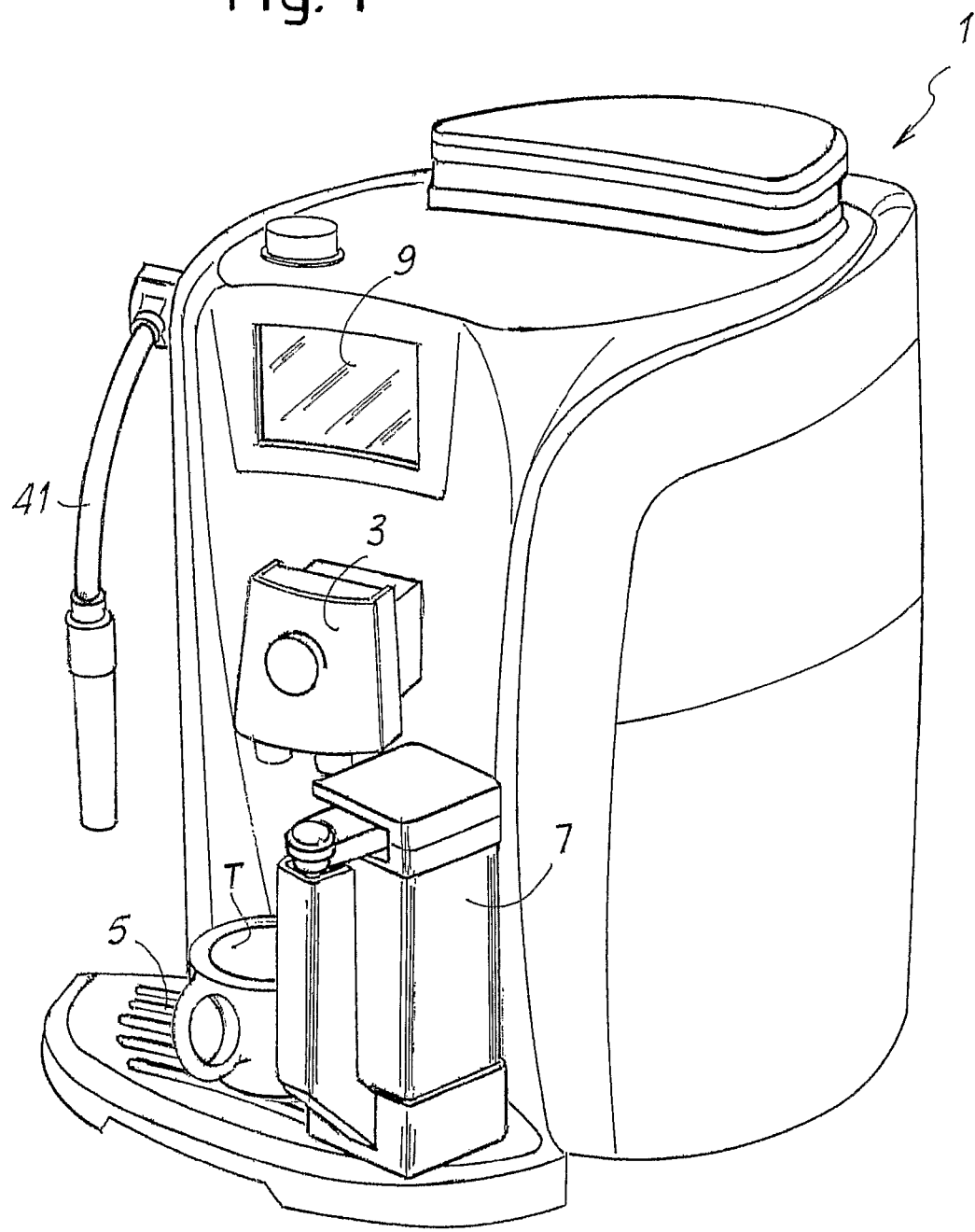
FIG. 1 shows an outer schematic view of a coffee machine to which the present invention can be applied.

In FIG. 1 a coffee machine for domestic use, wherein the present invention can be embodied, is shown in its entirety. The machine, indicated as a whole with number 1, has frontally a group of dispensing spouts 3, for example two spouts, from which the coffee produced by a brewing unit inside the machine is delivered. The brewing unit can be in general a group which uses single serving sachets, such as pods, capsules or cartridges, or a group which uses coffee powder, for example ground by a coffee grinder incorporated into the machine.

Below the dispensing spouts 3 a rest plane 5 is arranged for a coffee cup, a cup, a glass or other container, generally indicated with T, for collecting the beverage. On the rest plane 5 also a carafe 7 can be arranged, in which cold milk is contained for the production of milk froth, hot milk or the like, according to what set by the user on an interface schematically indicated with the number 9, with which the machine can be provided in an adequate position (in the illustrated example on the upper front part).

Figure 2:
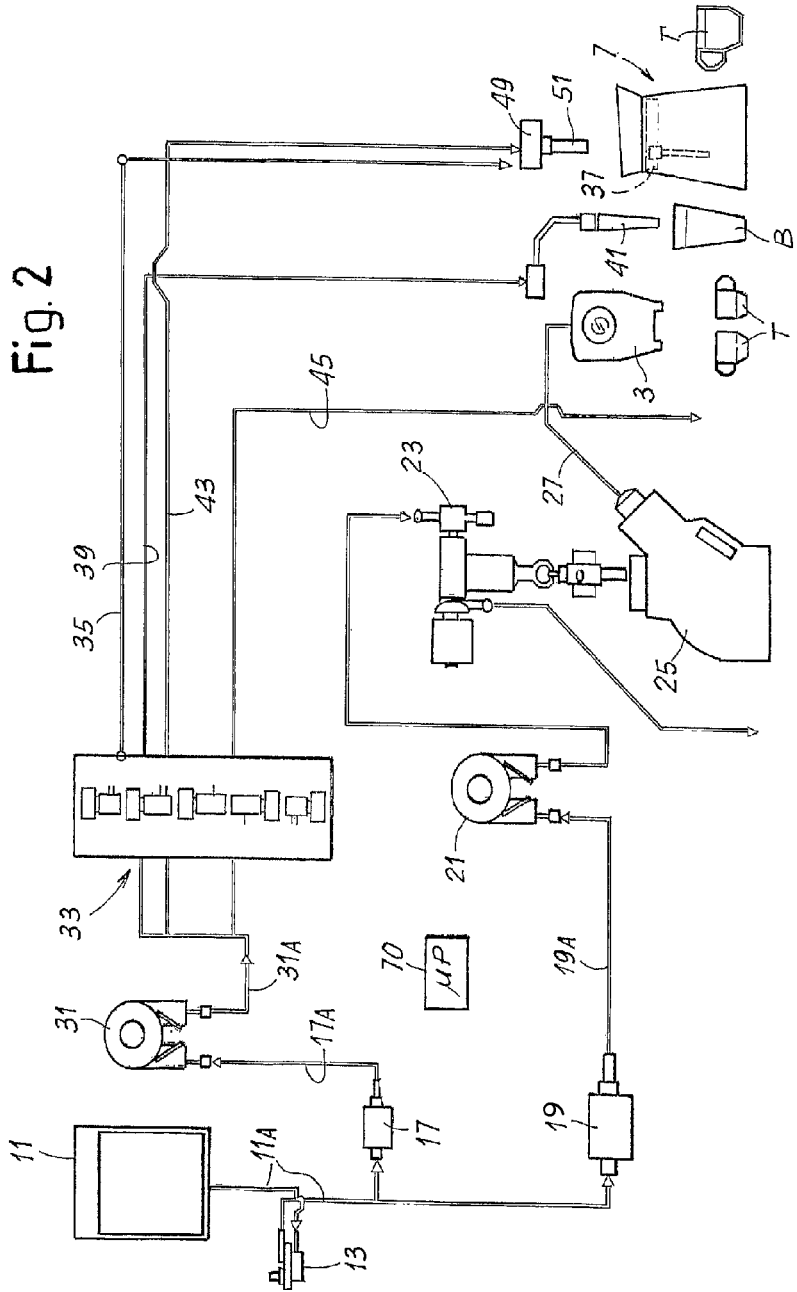
FIG. 2 shows a diagram of the main hydraulic components of the machine.
Figure 3:
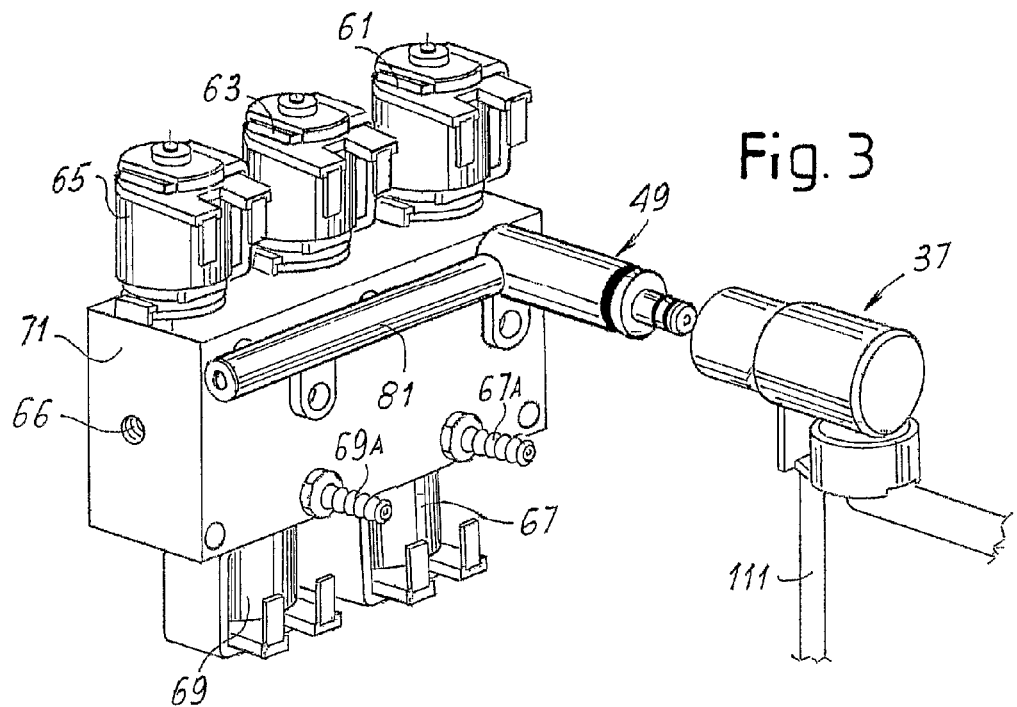
FIG. 3 shows an axonometric schematic view of the group of valves and of the connection joint for connecting to the emulsifying device, with the emulsifying device in the phase of insertion on the connection joint.
Figure 4B:
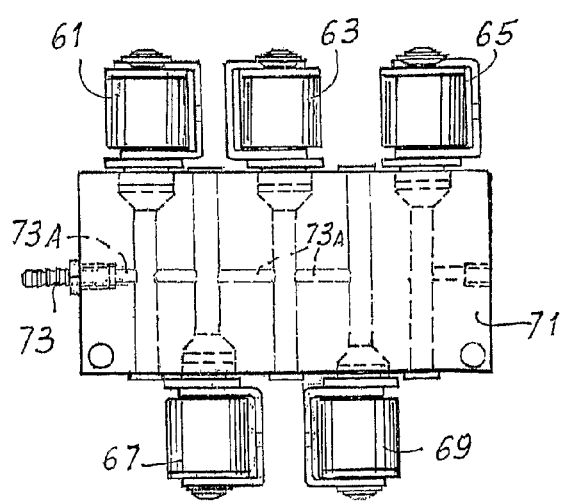
FIG. 4B shows a back view of the group of valves of FIG. 3.
Figure 4A:
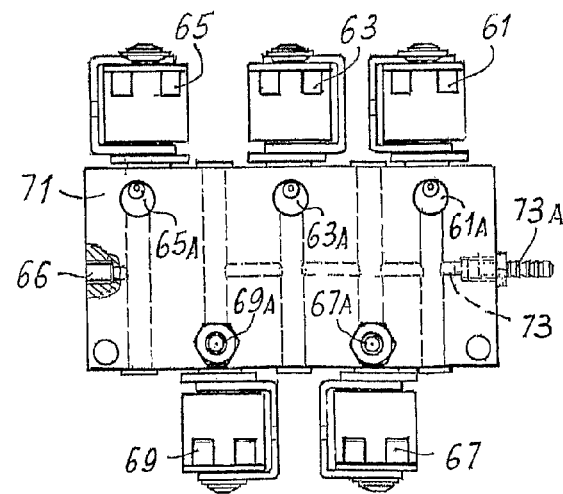
FIG. 4A shows a schematic front view of the group of valves of FIG. 3.

FIG. 2 schematically illustrates the hydraulic circuit of the machine in a possible embodiment.

In the diagram of FIG. 2, reference number 11 indicates a water tank, from which water is taken to generate hot water and/or steam in order to brew coffee, heat or emulsify milk or other. As it will be better described below, the same water can be used for cleaning the parts of the machine or the accessories thereof which enter into contact with the milk contained in the carafe 7.

Number 11A indicates a supply duct for supplying water from the tank 11, along which a flow meter is arranged (flow meter 13).

According to some embodiments, the duct 11A is connected to a first pump 17 and to a second pump 19. The latter supplies, through the duct 19A, water to a boiler 21 for the production of hot water for coffee brewing. The hot water is supplied through a group of valves, known per se and indicated with number 23, to a brewing unit 25 which can be designed in any known manner. The brewing unit comprises in general a brewing chamber inside which the pod, cartridge or single serving capsule or the coffee powder is inserted, and through which pressurized hot water, coming from the boiler 21, is made flow to brew coffee which is supplied through the spouts 3 connected to the brewing unit 25 by means of a duct 27. This part of the coffee machine is of the traditional type and it will not be described in greater detail here.

In some embodiments a further boiler 31 is provided, fed by the first pump 17 through a duct 17A. In other embodiments, not shown, a single boiler supplies the brewing unit 25 and the other members which will be described hereunder and which, in the illustrated embodiment, are vice versa supplied by the separate boiler 31.

The boiler 31 can be able to produce steam or hot water according to the requirements and the instructions given by the user through the interface 9. In other embodiments, not shown, to the boiler 31 a super heater can be associated, to generate overheated steam. The outlet duct 31A of the boiler 31 is connected to a group of valves schematically represented in FIG. 2 and indicated in its entirety with number 33, whose structure will be better described with reference to the following FIGS. 3 to 6. From the group of valves 33 four ducts come out, and more precisely:

a first duct 35 through which air or hot water flows for washing an emulsifying device 37 associated to the carafe 7 and better described in detail with reference to the following FIGS. 5 to 7;

a second duct 39 for feeding hot water or steam to a nozzle 41 of a known type and generally used to heat water or other liquids contained in a cup B or in other container through injection of steam coming from the boiler 31;

a duct 43 for feeding hot water or steam towards the emulsifying device 37; and a discharge duct 45.

The ducts 35 and 43 end in a joint 49 which, with an appendix or shank 51, can be tight connected to an inlet of the emulsifying device 37 as described in greater detail with reference to the subsequent figures.

Before describing in detail an embodiment of the components 33 to 51, the function thereof will be shortly described. Briefly, the purposes of the circuit described above are:

to discharge the pressure of the circuit through the duct 45 at the end of an operating cycle;

to feed hot water or steam through the duct 39 for the usual operations which are performed with these machines through the steam nozzle 41;

to produce hot milk or frothed milk by means of the emulsifying device 37;

to wash this latter and the other parts which enter into contact with the milk.

Below, a possible embodiment of the group of valves 33 and of the corresponding ducts will be described. However, it should be understood that this is only one of the possible embodiments of these machine components and that other embodiments can be used. What is important is that through the group of valves 33 or other equivalent members it is possible to control the supply of hot water and/or steam or air through the ducts 35, 39, 43 and 45. What characterizes these components is substantially the fact that the emulsifying device 37, which is connected to the joint 49, 51, can receive hot water or steam and, as the case may be, air to heat or froth the milk and, alternatively, steam or hot water for washing. The steam or hot water supply is performed through ducts 35, 43, separated but arranged, as it will be clear hereunder, so as to allow the correct operation of the emulsifying device in the phase of milk heating or frothing, and a complete washing of the emulsifying device.

In the illustrated embodiment, the group of valves 33 comprises five electronically controlled valves indicated with the numbers 61, 63, 65, 67, and 69. Each electronically controlled valve 61-69 is controlled by a central unit 70 schematically indicated in FIG. 2 and connected not only to the group of valves 33, but also to any other member which must be interfaced to the control unit or controlled or managed by the unit according to the instructions given by the user, for example the brewing unit 25 with its group of valves 23, the flow meter 13, the boilers 21 and 31, the pumps 17 and 19, etc.

The electronically controlled valves 61-69 are carried by a body 71 in which a duct 73 is provided, which, by means of a joint 73A, is connected to the output of the boiler 31. Substantially, the duct 73 is the construction embodiment of the exit duct schematically indicated with 31A in the diagram of FIG. 2. The duct 73 is connected to the inlet of the electronically controlled valves 61, 63, 67 and 69. The outlet of the electronically controlled valve 69 is formed by a joint 69A connected to the discharge duct 45, so that by opening the valve 69 it is possible to discharge the pressure from the circuit and in particular from the duct 73-31A. The outlet joint 67A of the electronically controlled valve 67 is connected to the feeding duct 39 of the nozzle 41, so that by opening the electronically controlled valve 67 it is possible to supply water or steam from the boiler to the nozzle 41, for example to heat through overheated steam a cup of water, or to fill a tea pot with hot water, or also to froth with manual operations the milk in a pot or in a cup in which the nozzle 41 is inserted.

The outlets of the two electronically controlled valves 61 and 63, indicated with 61A and 63A respectively, are connected to a common duct 81, to which also the outlet 65A of the electronically controlled valve 65 is connected. The inlet 65B of the electronically controlled valve 65 is in fluid connection with a gauged hole 66 provided in the body or block 71, in communication with the environment, to suck air for frothing the milk, as described below.

Figure 5:
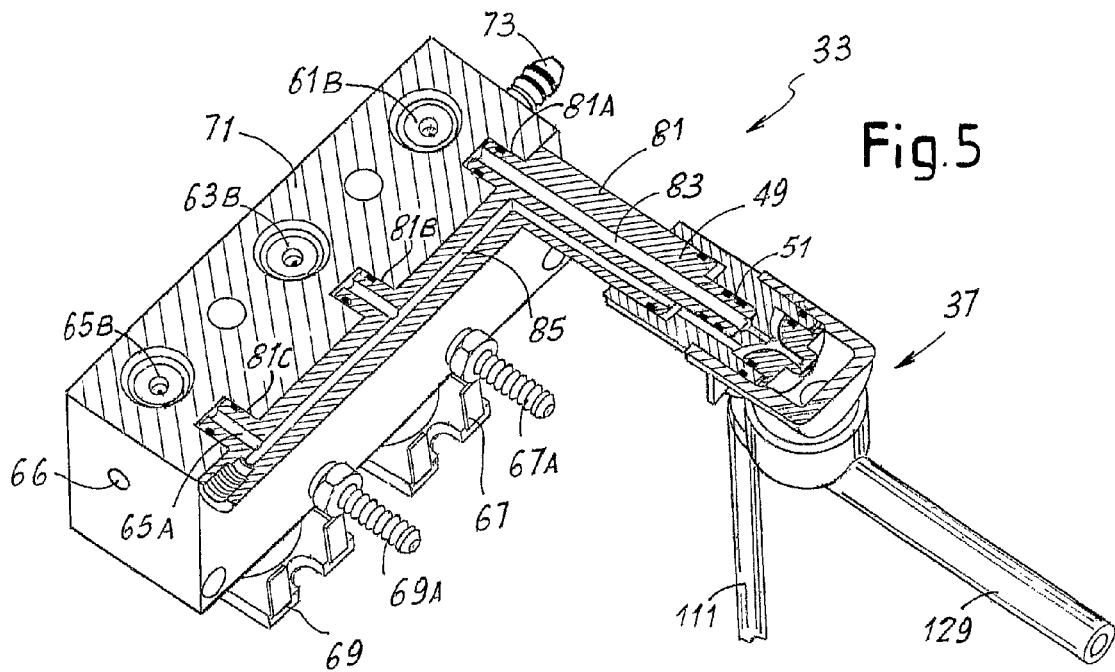
FIG. 5 shows an axonometric sectioned view of the group of valves and of the emulsifying device coupled to the joint of the machine.
Figure 6:
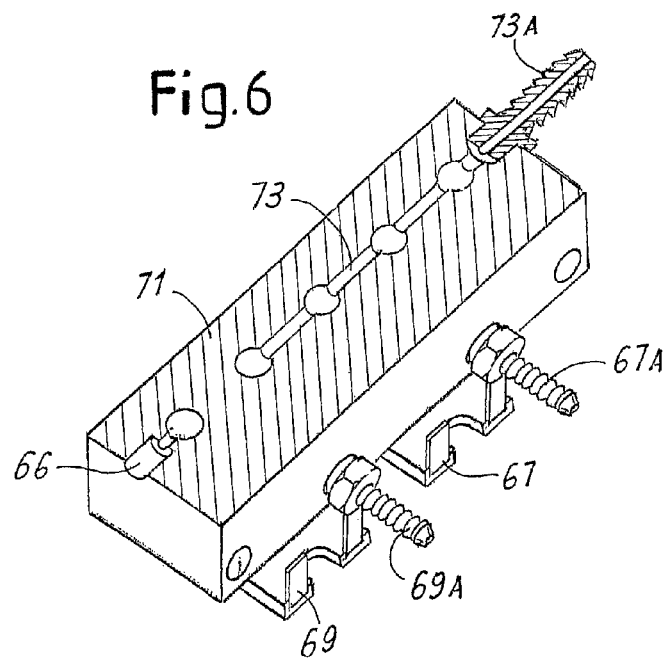
FIG. 6 shows an axonometric view sectioned in a different plane at a lower height relative to that of the section of FIG. 5.

As it is shown in particular in the section of FIG. 5, the duct 81 is in fluid connection with the two outlets of the electronically controlled valves 61, 63, 65 respectively. In this embodiment the connection is obtained by means of joints 81A, 81B, 81C. The joint 81A is in fluid connection with a first supply duct for supplying hot water or steam, which is indicated with 83 and extends nearly coaxially to the joint 49 with the appendix 51, which form the elements to which the carafe 7 is interfaced to receive steam or hot water from the group of valves 33. Therefore, the duct 83 constitutes the construction embodiment of the duct schematically indicated with 43 in the circuit diagram of FIG. 2. The duct 83 ends frontally with a first outlet 49A for hot water or steam towards the emulsifying device 37.

As it is shown in FIG. 7, the joint 49 has a tubular body, at whose end the outlet 49A is provided and around which gaskets 91 are arranged. In a back position, with respect to the first outlet 49A, on the joint 49 a second outlet 49B is provided for hot water or steam or, alternatively, air. The outlet 49B is connected with a duct 85 which is the construction embodiment of the duct indicated with 35 in the diagram of FIG. 2 and which is connected with the joint 81B and with the joint 81C and therefore with the outlet of the electronically controlled valve 63 and of the electronically controlled valve 65. In this way, at the outlet 49B hot water or steam can arrive by opening the electronically controlled valve 63, or air by opening the electronically controlled valve 65, depending upon the function required by the machine and carried out under the control of the control unit 70, as it will explained in greater detail hereunder.

In some embodiments, the outlet 49B is formed on an annular projection 93 which is in back position with respect to the end or appendix 51 of the joint 49, on which the outlet 49A is provided. To the annular projection 93 a gasket 95 is associated.

As it is clear in particular in FIG. 7, the emulsifying device 37 can be tightly connected to the joint 49; to this end said emulsifying device has a seat 101 with a hole 103 inside which the appendix 51 of the joint 49 is inserted. The gaskets 91 make a seal between the joint 49 and the inner wall of the hole 103. The hole 103 ends with an opening 105 which ends in front of a mixing nozzle 107, forming a Venturi tube within which (as will be described later on) mixing between steam and milk or steam, milk and air, and therefore simple milk heating or milk heating and emulsifying with the formation of hot milk froth occur. The opening 105 therefore constitutes a first entrance for hot water or steam towards the mixing nozzle 107 of the emulsifying device.

Between the opening 105 and the mixing nozzle 107 a suction chamber 109 is arranged, connected to a sucking duct 111, through which milk is sucked from the carafe 7 to which the emulsifying device 37 is combined.

In this embodiment the mixing chamber 109 develops around the opening 105 and in front of a facilitating surface of the mixing nozzle 107, and more precisely it is defined between an end wall 113A of a block 113 defining the seat 101 for inserting the joint 49 and a block 115 within which the mixing nozzle 107 is arranged. Between the block 115 and the block 113 a gasket 117 is arranged. The configuration is such that the components 113 and 115 of the emulsifying device 37 can be easily moved so as to be washed or in order to replace gaskets or other worn or damaged parts.

In the block 113 a second opening 121 is provided. In some embodiments, the opening 121 develops nearly parallel to the opening 105 and constitutes a second inlet for hot water or vapor or, alternatively, air towards the emulsifying device 37. The opening 121 extends from an entrance positioned in the portion with greater diameter of the seat 101 and an exit positioned in the suction chamber 109. In this way the opening 121 constituting the second inlet for hot water or steam or, alternatively, air in the emulsifying device 37 is put in fluid communication with the above mentioned duct 85 (35) when the emulsifying device 37 is connected to the joint 49.

In addition to the blocks 113 and 115, the emulsifying device 37 comprises (see in particular also FIGS. 8 and 9) a body 123 housing the blocks 113 and 115 forming respectively the first and the second inlet 105, 121 and the mixing nozzle 107. In the body 123 a chamber 125 is provided, inside which the mixing nozzle 107 ends and which is in fluid connection, through a passage 127, with a duct 129 for supplying hot or frothed milk. This latter is carried by a further component 131 of the emulsifying device 37, forming in this embodiment a closing and opening member for the milk suction duct 111. The component 131 has a nearly cylindrical seat, in which a lower portion is inserted and rotates, forming a shank for coupling the main body 123 of the dispenser. Between the two components 131 and 123 a gasket is advantageously arranged.

More in particular, as it can be seen in detail in FIG. 9, the milk suction duct 111 is constrained to the block 113, and it is therefore integral to the body 123 of the emulsifying device 37 and extends through an arched slot 131A provided in the closing and opening member 131, in a flanged portion of the member 131. The body 123 has a groove 123A in which the milk suction duct 111 extends. All is designed so that by rotating angularly the closing and opening member 131 around an axis A-A relative to the body 123 it is possible to obtain the throttling of the milk suction duct 111 which, for this purpose, is made of a flexible material, for example a silicon rubber. When the components 131 and 123 are in the position shown in FIG. 8, the milk suction duct 111 is in its rest conditions, with its cross section completely free and through it the milk can be sucked. Vice versa, in the arrangement rotated by nearly 100° illustrated in FIG. 9, the milk suction duct 111 is throttled between the groove 123A of the body 123 and the end of the slot 131A of the closing and opening member 131, so that the milk suction through the duct 111 is prevented or at least hindered.

The emulsifying device 37 is carried by the lid 7A of the carafe 7 and it is arranged so that the milk suction duct 111 develops inside the carafe so as to suck the milk contained inside it, whilst the supply duct 129 extends outside the carafe and can assume alternatively two positions corresponding to the positions of FIGS. 8 and 9. In a first position the supply duct 129 projects laterally relative to the carafe and the milk suction duct 111 is free (FIG. 8) and therefore milk can be sucked through it. This position is that in which the system is ready to supply hot milk or frothed milk. Vice versa, in FIG. 9, the supplying duct 129 is in an angular position displaced by nearly 90° and with respect to the body 123 of the emulsifying device 37 it takes such a position that the milk suction duct 111 is throttled, so that the steam passage of cannot cause the suction of the milk.

Operation of the system described hereinbefore is as follows.

The carafe 7 is arranged on the rest plane 5 of the machine 1 and is arranged in such a manner that the joint 49 of the machine is inserted in the seat 101 of the emulsifying device 37.

To produce frothed milk, the closing and opening member 131 of the emulsifying device is put in the position of FIG. 8, so that the supply duct 129 is in a projecting position relative to the carafe 7 and below it a cup T can be arranged. In the latter coffee produced by the brewing unit 25 may have already been dispensed through the spouts 3. In order to supply frothed milk in the cup, the operator chooses the necessary function by means of the interface 9 and the control unit 70 controls the group of valves 33 so as to open the electronically controlled valve 61 and the electronically controlled valve 65, leaving the electronically controlled valves 67, 69, and 63 closed. In this way the steam generated by the boiler 37 flows, through the duct 73 and the open electronically controlled valve 61, in the duct 83 (43) and therefore in the emulsifying device by being dispensed through the outlet 49A in the steam opening or entrance 105 of the emulsifying device, such as to flow in this manner through the mixing nozzle 107.

In a known manner, the flow of overheated steam through the opening 105 and the mixing nozzle 107 generates a suction in the suction chamber 109, so that the milk is sucked through the milk suction duct 111 which, as noted above, in this arrangement is free. The suction in the suction chamber 109 also causes air suction through the gauged hole 66 and through the electronically controlled valve 65, which is in open condition. The air flows through the duct 85 (35) towards the outlet 49B of the joint 49 and therefore inside the opening 121 which constitutes the second inlet of the emulsifying device 37. As it is well known the air suction causes the formation of milk froth which is projected by the mixing nozzle 107 in the chamber 125 and therefore, through the passage 127, in the supply duct 129 and lastly in the cup T.

Vice versa, when the production of hot unfrothed milk is desired, the operator sets this function by means of the interface 9 and the central unit 70 switches the group of valves 33 in the following condition: the electronically controlled valves 67, 69, 63 and 65 are closed whilst only the valve 61 is opened. In this condition the steam flows in the inlet formed by the opening 105 of the emulsifying device 37 and therefore it sucks milk from the carafe 7 through the milk suction duct 111 and in the mixing nozzle 107 milk is heated without being frothed, by means of exchange of the vaporization heat from the steam to the milk. Through the supply duct 129 hot milks exits.

In any moment it is possible to clean the emulsifying device 37 and the ducts which enter into contact with the milk, without contaminating the milk contained in the carafe 7 or in other tank or container to which the emulsifying device 37 is combined. This washing cycle can be carried out for example by the user the first time he connects the carafe 7 to the machine 1, or before shutting down the machine and removing the carafe to put it for example in the refrigerator, or also before and/or after each hot milk or frothed milk supply cycle. The washing cycle can be manually controlled or automatically set for example before and/or after each milk supply.

In order to perform a washing cycle, it is firstly necessary to put the closing and opening member 131 in the closed position, i.e. in the position in which the milk suction duct 111 is throttled, to avoid both contamination of the milk in the carafe 7 and milk suction during the washing cycle. Therefore the emulsifying device 37 must take the position of FIG. 9.

In this condition the milk suction duct 111 is pinched. The emulsifying device can be provided with an activating element for activating a second microswitch, which enables the machine to perform the washing cycle once this position has been reached.

At this point the operator can activate the washing cycle through the interface 9. In this case the control unit 70 closes the electronically controlled valves 67, 69, 65 and 61 and opens the electronically controlled valve 63. The steam produced by the boiler 31 flows in this way under the thrust of the pump 17 not through the electronically controlled valve 61 and therefore the duct 83 (43), but through the duct 85 (35). In this way the steam or hot water flows through the opening 121, i.e. through the second inlet of the emulsifying device 37, in the suction chamber 109 and from the latter in the mixing nozzle 107, in the chamber 125, in the passage 127 and in the supply duct 129. The throttling of the milk suction duct 111 prevents steam or hot water from entering in the carafe 7, thus preserving the integrity of the cold milk contained in it.

In other embodiments it is possible to provide that the washing phase by supplying steam or hot water through the opening 121 is followed by a second phase, even shorter than the first as the case may be, during which the steam or hot water flows not only through the duct 85(35) and the opening 121 but also through the duct 83(43) and the opening 125 in-line with the Venturi tube 107. In this way firstly the suction chamber 109 is washed. Subsequently, the valve 61 is opened again and steam and/or hot water is supplied also axially into the Venturi tube through the opening 105 eliminating any backflow of milk towards the duct 83 (41). The flow rate of water and/or steam can be such to cause a pressure greater then the ambient pressure, instead of activating the Venturi tube. This allows to carry out a cleaning of the initial part of the milk suction duct 111, thanks to the tendency of the hot water and/or of the steam to penetrate inside it.

In some embodiments, in addition to the deep washing cycle, described above, a short washing cycle can be performed, to be carried out at the end of each milk supply, without the need of closing the supply duct. In this short washing cycle steam and/or hot water may be supplied through the opening 121, through the opening 105 or through both of them, also in sequence as the case may be. For example a first short phase can be provided of supply only through the opening 121, without passage in-line to the Venturi tube and subsequently supply through both the opening 121 and 105. In this case a slight overpressure is generated, which eliminates the milk residues from the initial portion of the milk suction duct 111 which is not closed. This short washing cycle, as well as the deeper cycle to be carried out when the duct 111 is closed, allows the steam and/or hot water flow to reach all the parts that enter in contact with the milk, maintaining them clean and avoiding the accumulation of milk residues which can be a medium for developing of dangerous micro organisms.

In modified embodiments, not shown, the milk suction duct 111 can be closed in a different manner, for example by means of a faucet, a valve or the like. Preferably, the device for closing the suction duct 111, irrespective of which device it is, is actuated with a simple movement of the emulsifying device; said movement can be also preferably switch in an enabling state the microswitch that controls the supply of the steam and/or of the hot water for cleaning the emulsifying device. Preferably, as shown in the drawing, the movement causing the closing of the milk suction duct and enabling the actuation of the washing function with hot water or steam also brings the supply duct 129 in such a position to discharge the hot water, the steam and/or the condensation water used for the washing cycle towards the grid forming the rest plane 5 for the carafe 7 and therefore in the waste water collecting tray which is usually arranged below said grid.

With the described system the steam or hot water flow generated by the boiler 31 washes and sterilizes or hygienizes in a complete manner all the parts of the system, and in particular the emulsifying device 37, that were in contact with the milk, in particular thanks to the fact that the hot water or steam flows exactly along the same path along which the supplied milk flows.

In this way a complete and deep washing is obtained, without the need of performing particular operations in addition to that of actuating the washing cycle after having positioned in a correct manner the closing and opening member 131. It is also possible to provide that this washing cycle is carried out in an obliged manner, for example at least before removing the carafe 7 from the machine. For this purpose, e.g. a block member can be provided for blocking the carafe when it is arranged on the machine, with the emulsifying device 37 constrained to the joint 49, and this blocking member is deactivated only after the closing and opening member 131 has been put in the closing arrangement for closing the milk suction duct 111 and once the machine has performed the washing cycle in an automatic manner, or under the control by the user.

In some embodiments it is also possible to provide a washing or cleaning cycle for washing or cleaning the air suction passage and in particular the gauged hole 66. Actually, the latter can be subjected to clogging due to the impurities present in the atmosphere, because of the extremely small diameter of this hole. This cleaning can be obtained, for example, with a specific flushing phase, which is carried out exactly as the washing cycle described above, however maintaining the electronically controlled valve 65 open. In this way the steam generated by the boiler 31 flows not only across the emulsifying device 37 to perform washing, but it also moves backwards through the air path until the entrance of the gauged hole 66.

In some embodiments the device described in particular with reference to FIGS. 8 and 9 can be designed as a component separated from a carafe and it can be used in combination with any milk container, for example a usual package or bottle used for milk packaging and sale.

Embodiment of FIGS. 10 to 16

FIGS. 10 to 16 show a construction embodiment of a group of valves and of a carafe usable with a machine provided with the above mentioned group of valves. The components and the functions are substantially the same already described with reference to the previous figures, but in the above mentioned FIGS. 10 to 16 an optimized construction embodiment of the carafe and of the group of valves is represented. The same numbers indicate the same or equivalent parts to that described with reference to the previous figures.

As regards the group of valves 33, the configuration shown in FIGS. 10 to 16 has a different arrangement of the valves 61 to 69 and a more compact conformation of the body 71 to which the corresponding electronically controlled valves are associated. Furthermore, on the air suction duct 66 a regulating member 68 is provided for adjusting the flow section of the suction duct, with a known configuration.

Furthermore, as the group of valves 33 is preferably housed in a fixed position inside the machine, whilst the joint 49 is preferably arranged on an openable hatch which allows the inspection of the inner parts, the group of valves 33 is connected to the joint 49 through flexible ducts indicated again with 83 and 85, which materialize the ducts 83, 85 that in the previous example of embodiment are formed in a rigid member connected in a stable manner to the body 71 of the valves. The joint 49 can be mounted by means of brackets 49A (see in particular FIG. 10) to an openable hatch, not shown for the sake of greater clarity of the drawing.

As it is visible in particular in FIGS. 10 and 11, the body 71 of the group of valves 33 has an optimized dimension to reduce to the utmost also the quantity of plastic material used. Substantially it forms in a single molded resin block the duct 73 for the distribution of the steam and/or of the hot water with the joint 73A and the flanges for inserting the electronically controlled valves with the corresponding outlets. Also brackets 71A are formed on the molded block for the connection of the group of valves 33 to the machine.

The joint 49 as well as the emulsifying device 37 have substantially the same shape already described with reference to FIGS. 1 to 9.

In FIGS. 10 to 16 a possible embodiment of the carafe 7 is shown, to which the emulsifying device 37 is associated.

More in particular, in the illustrated example the carafe 7 includes a lower body or part 7A which forms the volume for containing the milk and inside which the milk suction duct 111 extends. The lower body 7A has a handle 7B which has a particular shape, as it projects from the carafe with a free upper end for the purposes which will be explained below. Preferably, as it is shown in particular in the section of FIGS. 14 and 16, the handle 7B is produced in a single piece with a seat 7C for housing the body 7A of the carafe. Substantially, the lower part of the carafe is therefore formed by the main body 7A, forming the volume for containing the milk, and by a housing 7C where the body 7A is housed. In this way it is possible to dismount the carafe for a more accurate cleaning. The seat 7C has inferiorly a hole 7D at the handle 7B. In some embodiments the handle is provided with a hollow cross section and substantially defines a channel or duct for discharging the washing water or the condensation water produced by the washing steam, towards the aperture 7D and therefore towards the rest plane of the machine on which the carafe rests, so as to discharge the washing water as better explained hereunder. Also a discharge hose can be housed in the handle, for example made in rubber or elastomer. This may also have the function of heat insulation to prevent the handle of the carafe from overheating due to the passage of the hot washing water and/or steam.

The carafe 7 is provided with an upper lid 7E, onto which the emulsifying device 37 is mounted. The lid 7E can have grooves 7F for gaskets between the lid and the body 7A of the carafe. The lid 7E presents a housing cavity 7G inside which the emulsifying device 37 is mounted and which is closed at the top by a cap 7H. In this way the emulsifying device 37 as well as, as it will be apparent hereunder, the closing and opening member 131, are housed in the cavity 7G suitably protected by the cap 7H. In the lower part the cavity 7G is closed by a wall 7L in which a hole 7K is provided, crossed by the milk suction duct 111.

The closing and opening member 111 is hold and guided in its motion of rotation around a vertical axis by a collar 7M. Furthermore, the closing and opening member 131 has an arched slot 131A, through which the milk suction duct 111 extends, and which cooperates with the hole 7K to form a system for throttling the milk suction duct 111, in a manner similar to that described with reference to the previous example of embodiment as regards the slot 131A (FIG. 9).

In this embodiment the closing and opening member 131 is also provided with a pair of cam profiles 131B and 131C. The cams 131B and 131C cooperate with respective stems 161B and 161C for actuating the microswitches associated to the machine and schematically shown only in FIG. 14 and here indicated with 163. These are substantially two adjacent microswitches which can be actuated respectively by the stem 161B and by the stem 161C. These latter are housed in holes formed in the corresponding wall of the lid 7E, one of which is indicated with 165 in FIG. 10. The stems 161B and 161C are engaged to corresponding leaf springs 167B and 167C fixed to the lid 7E. The leaf springs stress the stems towards the inner of the cavity 7G against the effect of the one and of the other of the cams 131B and 131C. As these latter have a given angular development and a given angular position relative to the closing and opening member 131, by rotating this latter relative to the body of the carafe 7 it is possible to actuate now one then the other of the stems 161B and 161C, and it is therefore possible to actuate now one then the other of the two microswitches 163, depending upon the angular position taken by the closing and opening member 131 relative to the carafe 7, and this all in order to enable the machine to perform a washing cycle or to supply steam or hot water towards the carafe according to what is required by the user through the interface of the machine and/or according to programs stored in the machine.

The operation of the machine and of the carafe in this configuration can be easily understood in view of the above description and of what described with reference to the previous embodiment of FIGS. 1 to 9, and it will be again discussed briefly hereunder.

The carafe 7 containing the milk is connected to the coffee machine by inserting the joint 49 inside the corresponding seat of the emulsifying device 37 contained in the closing part of the carafe. When the closing and opening member 131 is in the position shown in FIGS. 11, 12, 15, and 16, the milk duct 129 for supplying hot frothed milk is axially aligned to the emulsifying device 37 and (see in particular FIG. 16) its outlet is above the handle 7B of the carafe 7. The closing and opening member 131 is in such a position that the slot 131A throttles the milk suction duct 111. The cam profile 131C of the closing and opening member 131 pushes the stem 161C so as to actuate one of the two microswitches 163 and more precisely the microswitch which enables the washing cycle of the emulsifying device 37. In this way, in an automatic manner or under the control of the user, the group of valves 33 is switched so that the washing valve 63 is opened whilst the valves 61, 65, 67, and 69 remain closed. The hot water or steam flows across the duct 85 (35), through the body 113 of the emulsifying device until it achieves the suction chamber 109, the mixing nozzle 107, the chamber 125 and the duct 129 for supplying the frothed hot milk. From this latter the hot water and/or the condensation water are discharged in the channel formed by the handle 7B, and they are collected through the hole 7D towards the tray below the carafe rest grid or plane of the machine.

As described with reference to FIGS. 1 to 9, also in this case the washing cycle can be completed with a second phase, during which the valve 61 is opened again, so as to have a simultaneous flow of hot water or steam directly in the suction chamber through the opening 121 and axially in the Venturi tube through the opening 105. The above mentioned phases can be carried out also in the inverse manner. Furthermore, as mentioned above, also in this case a short washing cycle can be provided, which is carried out without rotating the milk supply duct and therefore without closing the suction duct 111. This short washing cycle can be carried out at the end of each milk supply cycle. Preferably, the short washing cycle at the end of the milk supply is carried out in an automatic manner, so that the user does not need to remember to actuate it each time.

Figure 13:
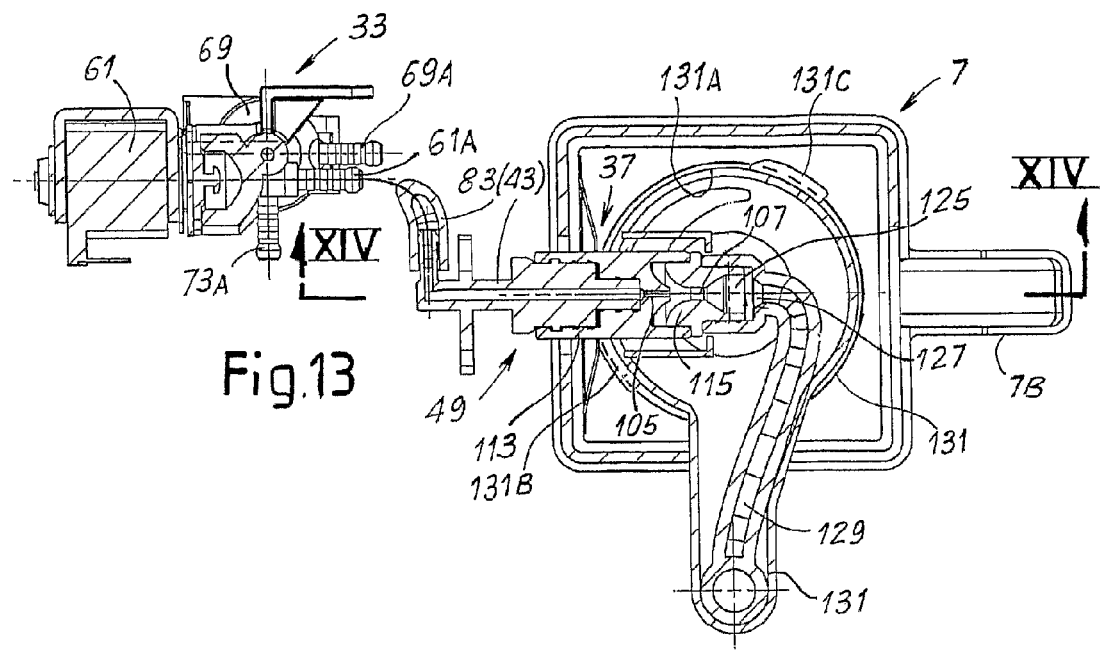
FIG. 13 shows a second according to a horizontal plane of the carafe connected to the group of valves in the arrangement for supplying frothed milk.
Figure 14:
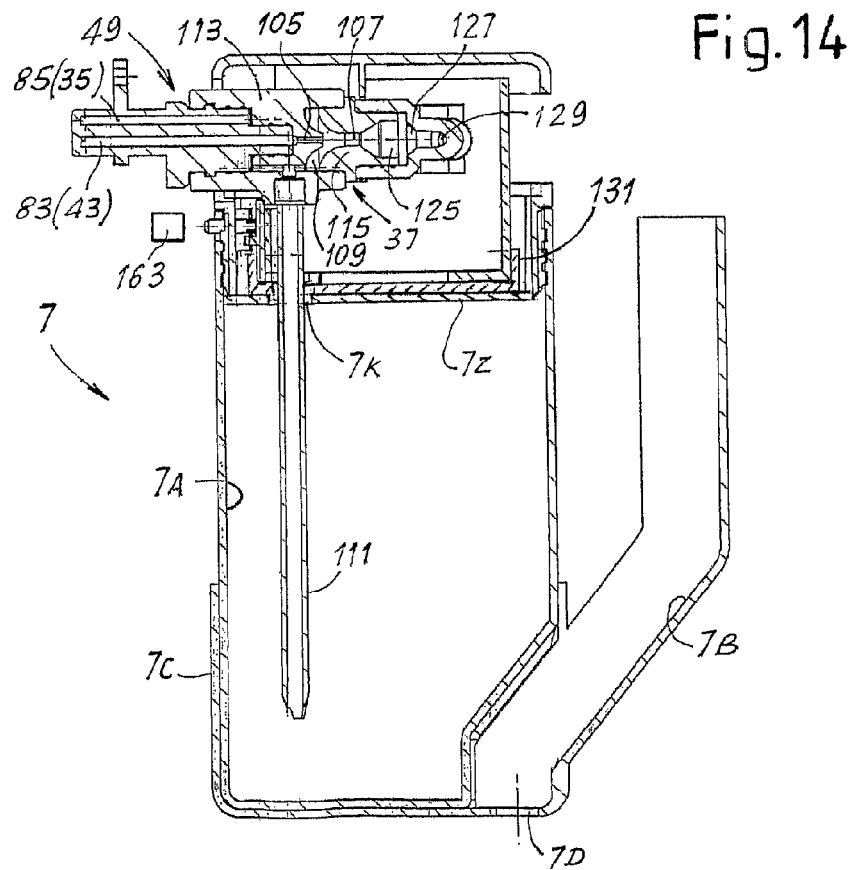
FIG. 14 shows a section according to XIV-XIV of FIG. 13.
Figure 15:
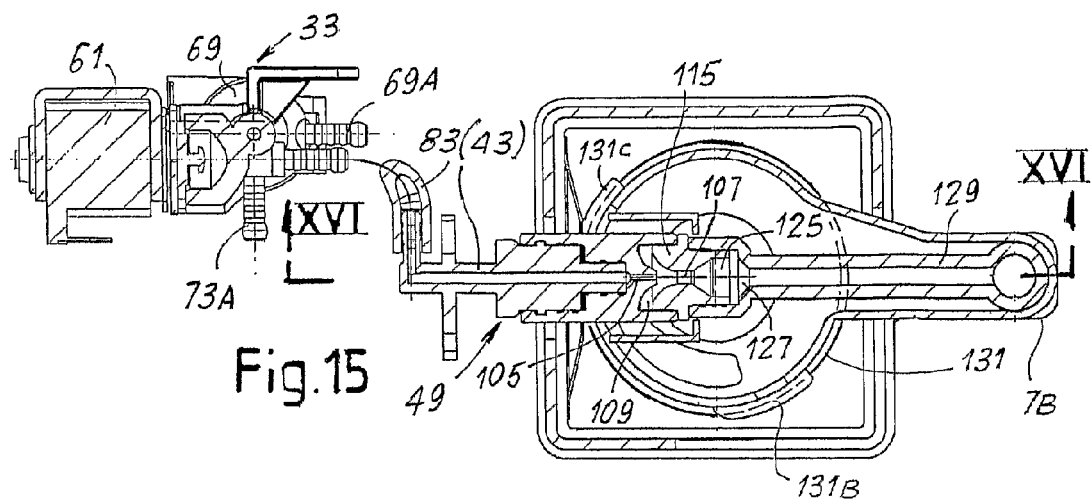
FIG. 15 shows a section similar to the section of FIG. 12 with the carafe in washing position.
Figure 16:
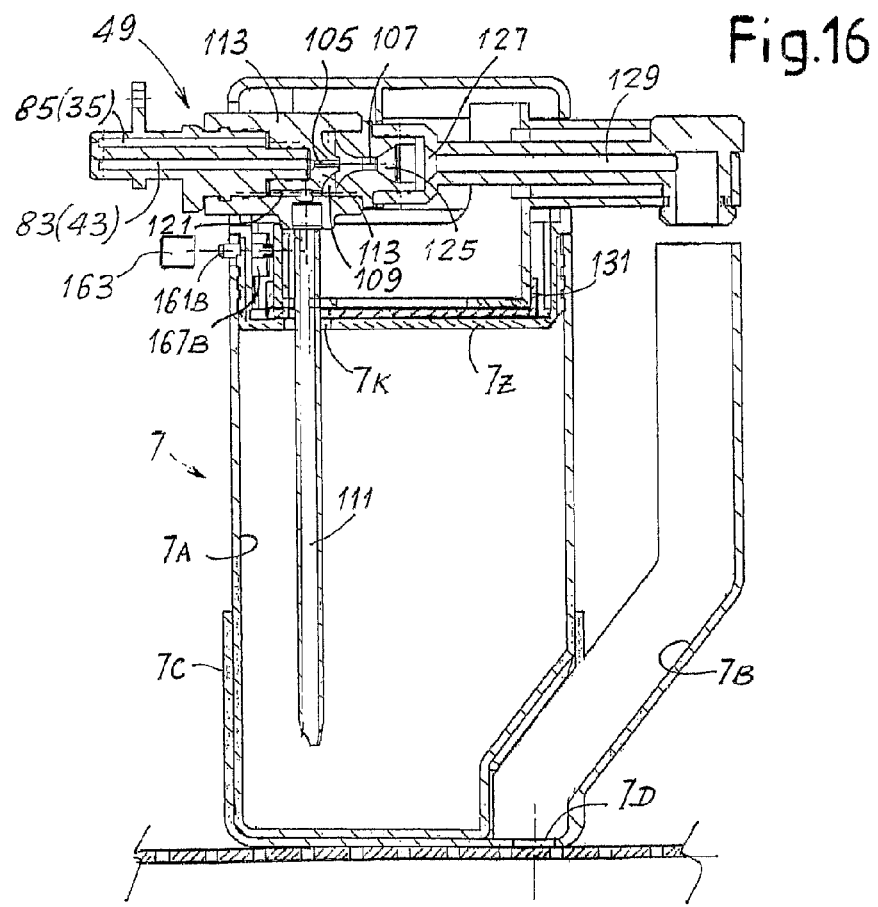
FIG. 16 shows a section according to XVI-XVI of FIG. 15.

By rotating the closing and opening member 131 by nearly 90° and taking the position of FIGS. 13 and 14, the milk supply duct 129 is in a projecting arrangement relative to the body of the carafe 7, at its side where a cup can be positioned. The position is such that also the coffee supplied by dispensing nozzle 3 of the machine can be collected the in the cup (see FIG. 1). The rotation by 90° of the closing and opening member 131 entails a bending of the frothed milk-supply duct 129, which in this embodiment is made of flexible material, e.g. silicon rubber, to allow this deformation. The milk suction duct 111 is made free, i.e. it is no more throttled. The cam 131B pushes the stem 161B which switch the corresponding microswitch 163 to enable the machine to carry out a cycle of supplying frothed hot milk or unfrothed hot milk (when the air suction hole is closed) according to what is required by the user. When the cycle is actuated, depending upon whether the supply of hot milk or of hot frothed milk is required, the valves of the group 33 are switched in a corresponding manner, and more exactly the valve 63, the valve 67 and the valve 69 remain closed whilst only the valve 61 is opened if hot milk is required, or the valve 61 and the valve 65 are opened if frothed hot milk is required.

The system for closing the flexible milk suction duct 111 can be used, not only for closing completely the duct during the suction phase, but also to reduce the cross section of said duct, for example providing intermediate positions of the closing and opening member 131 between the total opening position and the total throttling position of the duct 111. In this way it is possible to reduce the flow of milk during heating or frothing. With the same steam flow rate this entails a greater heating of the milk. In this way the user can use the partial throttling system of the milk suction duct 111 to set the temperature of the obtained beverage. This function can be irrespective of the other characteristics described above, and it can be for example actuated in emulsifying devices which have other system for air inlet and/or for washing and cleaning.

Embodiment of FIGS. 17 to 24

FIGS. 17 to 24 show a modified embodiment of the carafe to which the invention is applied. The same numbers indicate the same or equivalent parts to those in the previous embodiment.

Figure 17:
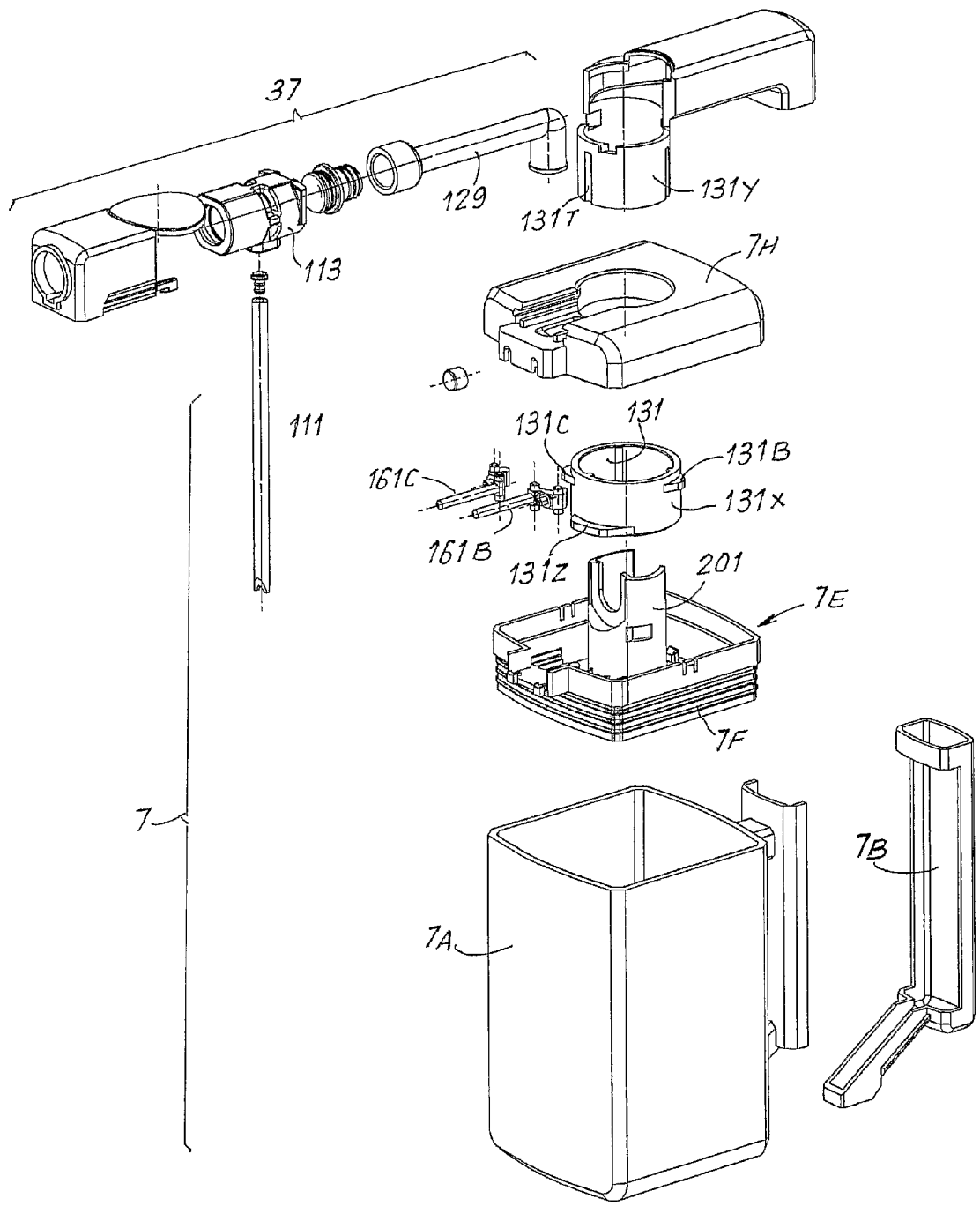
FIG. 17 shows an exploded view of a carafe in a modified embodiment.
Figure 21:
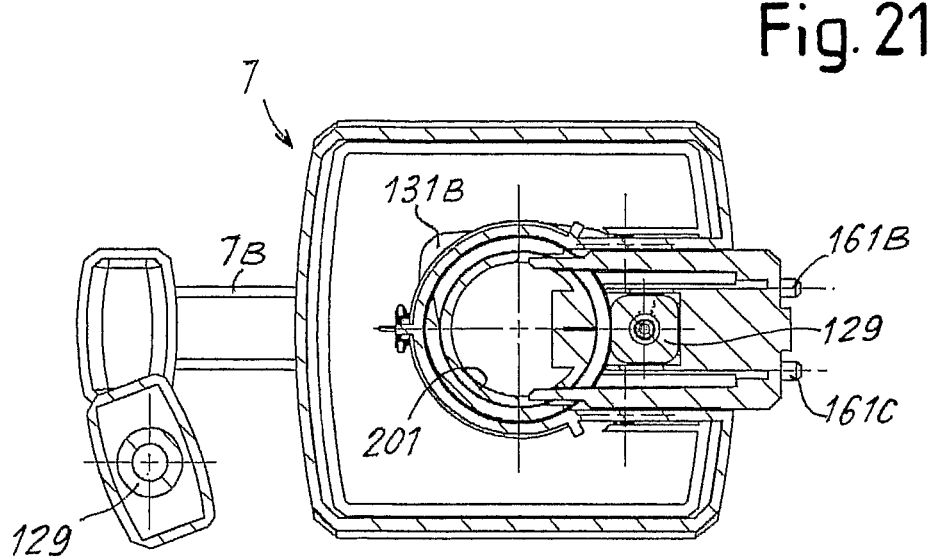
FIGS. 21 and 22 show sections similar to the sections of FIGS. 19 and 20 in a disassembled condition.
Figure 22:
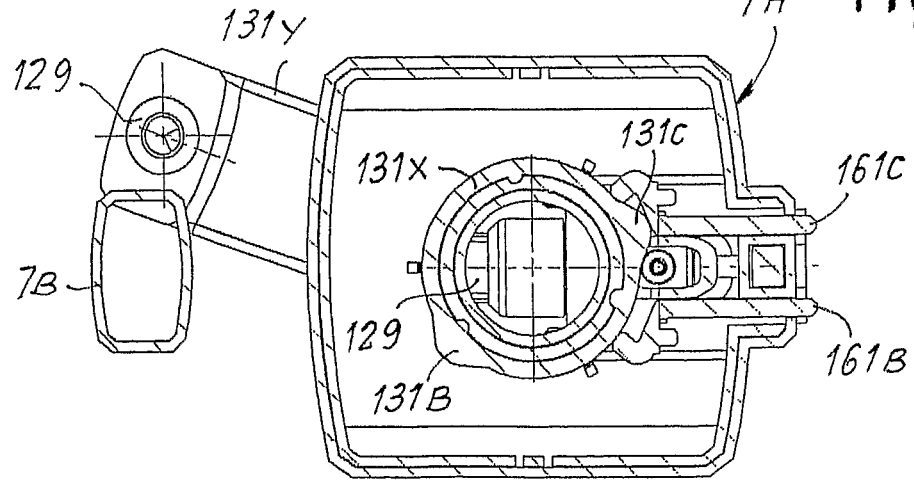

The carafe 7 has a body 7A and a handle 7B which forms inside itself a channel for discharging the hot water or the condensation water of the steam used for washing the emulsifying device, indicated as a whole with number 37 and shown in an exploded arrangement in FIG. 17. The carafe has a lid formed by two portions 7E and 7H mutually coupled and shaped so as to house the emulsifying device 37. The lower portion 7E of the lid of the carafe has a gasket 7F on the body 7A of the carafe. from the bottom of the portion 7E a nearly tubular shank 201 projects, to which the closing and opening member 131 is coupled, also forming the passage for the milk supply duct 129.

Also in this embodiment the milk supply duct 129 is made of flexible material so as to bend when the closing and opening member 131 rotates in the different positions provided for milk supply and for carafe washing. In this embodiment the closing and opening member 131 is formed by two coupled parts, indicated with 131X and 131Y, this latter forming the housing for the milk supply duct 129. The portions 131X and 131Y are coupled by means of a shape coupling including projections 131S formed in the inner wall of the component 131X, which engage in groove 131T formed on the outer surface of the component 131Y. In this way the component 131X and 131Y are torsionally engaged. The unit formed by the components 131X and 131Y is fitted on the tubular shank 201 and can rotate about it.

The element 131X of the closing and opening member 131 is axially blocked on the lower portion of the lid 7E by means of an elastic tooth 203 which engages in a groove with partial annular development formed in the element or component 161X, so as to allow the rotation of the closing and opening member 131 around the axis A-A.

On the outer surface of the component 131X cam profiles 131B and 131C are obtained, having the same function of the cam profiles 131B and 131C illustrated in the previous embodiment. These profiles cooperate with stems 161B and 161C which actuate microswitches of the coffee machine to enable the washing cycle, or the supply cycle, as described in greater detail with reference to the previous figures.

Furthermore on the component 131X is provided a shaped projection 131Z, which forms the real closing element for closing the milk suction duct 111, which passes across a hole 7X in the bottom wall of the outer portion 7E of the lid of the carafe so as to achieve the bottom of the latter. The cam profile 131Z is shaped in such a manner that, by rotating the component 131X of the closing and opening member 131, it is possible to press the flexible milk suction duct 111.

Figure 23:
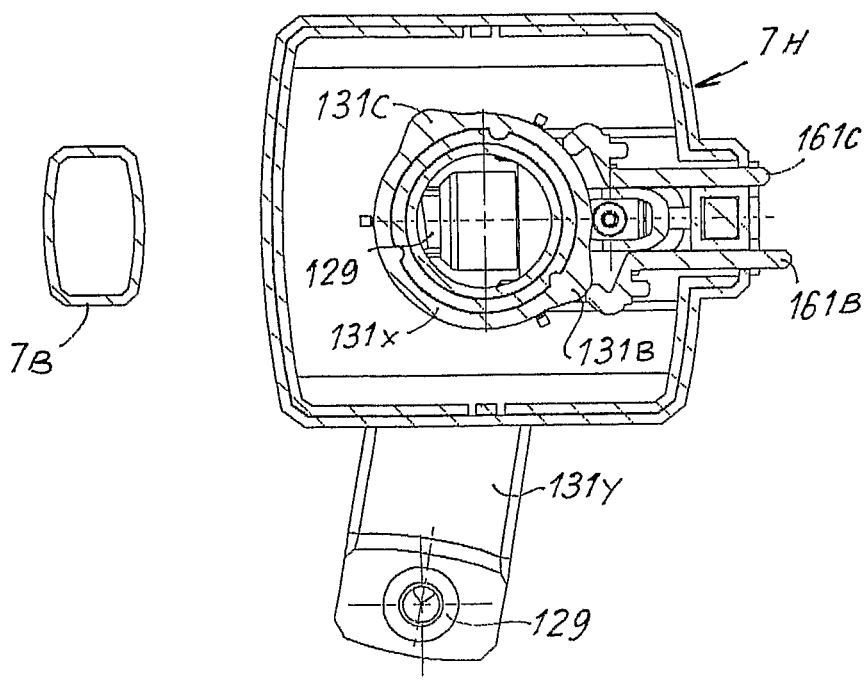
FIGS. 23 and 24 show sections similar to the sections of FIGS. 19 and 20 in the arrangement for supplying frothed milk or hot milk.
Figure 24:
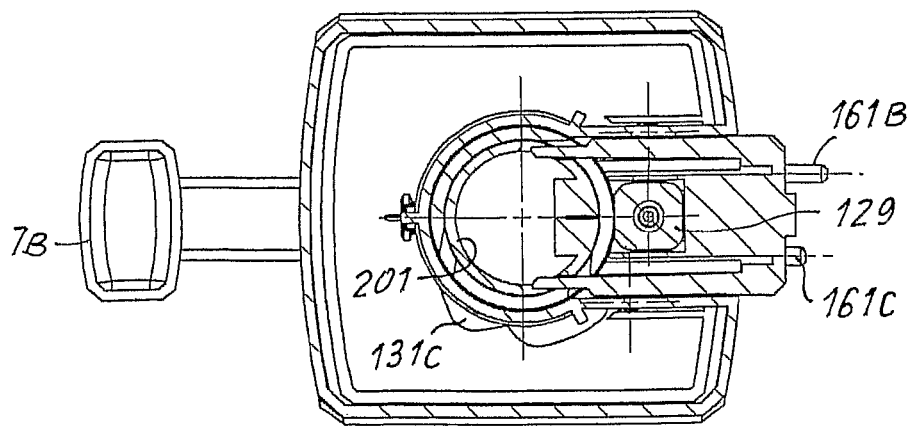

The operation of the carafe illustrated in FIG. 17 and in the following figures is substantially similar to that of the carafe illustrated in the previous embodiment and it is made clear by the figures which show in section the different positions taken by the closing member during the washing phase (FIGS. 19 and 20) and during the milk supply phase (FIGS. 23 and 24). In particular in these figures the movement of the stems 161B and 161C, which actuate the microswitches which enable the one or the other of the above mentioned cycles, is visible. In the embodiment illustrated here a further position is also provided, shown in particular in the sections of FIGS. 21 and 22, wherein the closing and opening member 131 formed by the component 131X and 131Y is made to oscillate around the axis A-A by an angle which represents an over travel relative to the washing position. In the position shown in FIGS. 21 and 22 the carafe can be demounted. Also in this embodiment it is possible to partially throttle the milk suction duct 111 so as to adjust the supply temperature.

Figure 25:
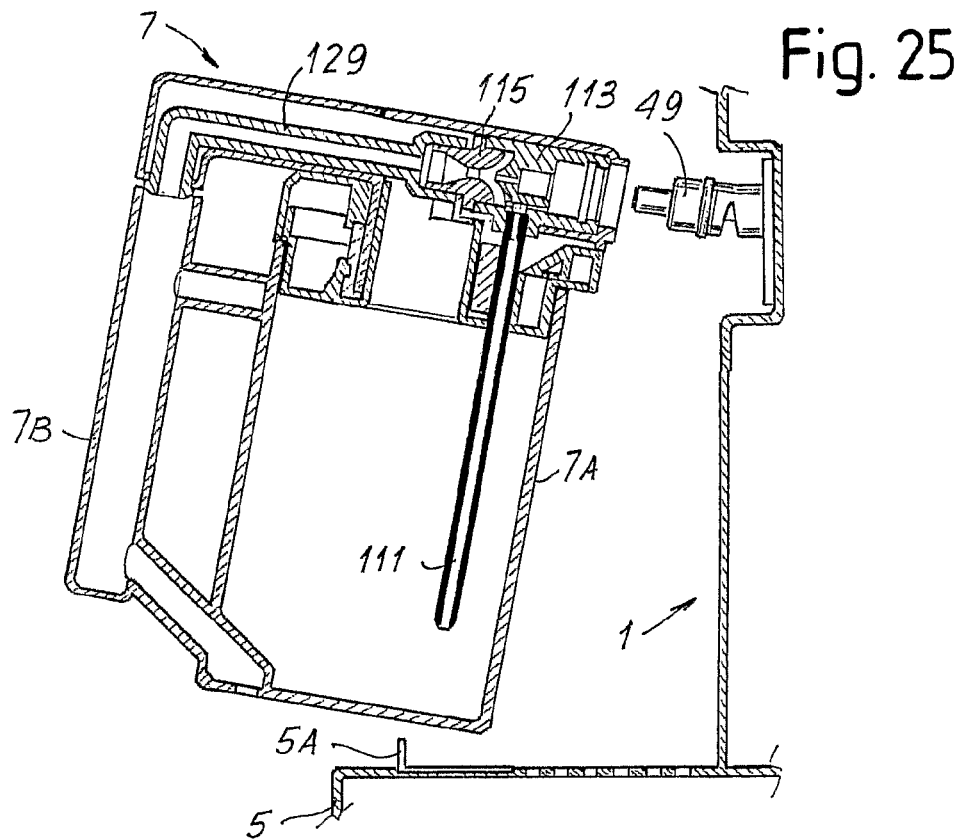
FIGS. 25 and 26 show a modified embodiment of the present invention.
Figure 26:
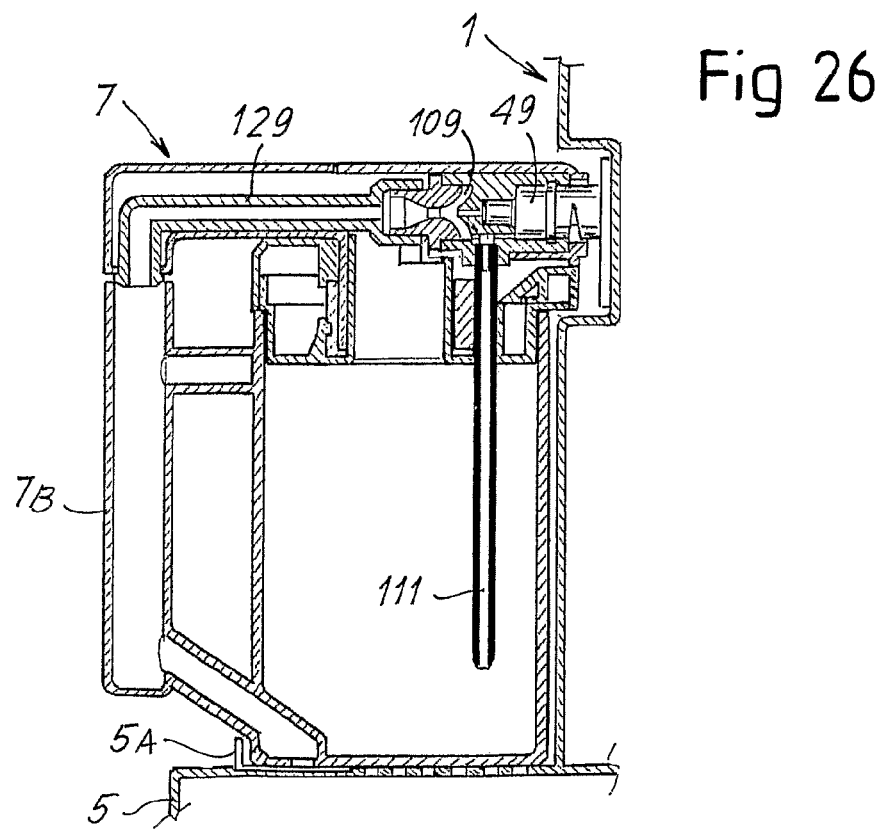

Embodiment of FIGS. 25 and 26

In FIGS. 25 and 26 a partial section of a machine according to the present invention is shown, provided with a carafe 7. The coffee machine, indicated as a whole with number 1, comprises a rest plane 5 with a grid on top for resting the coffee cup or other containers, and the carafe 7. When the carafe 7 is not connected to the joint 49, the latter is oriented upwards. The insertion of the carafe occurs therefore by maintaining the latter inclined and moving it towards the joint 49 according to a downwardly inclined trajectory, allowing the insertion of the joint in a seat which can be similar to the seat 101 already described with reference to the previous embodiment. The insertion of the carafe according to an inclined direction allows its bottom to pass beyond a locking element 5A fixed to the upper surface of the rest plane 5. When the mutual coupling position between the carafe 7 and the joint 49 has been achieved, the carafe can be rotated downwards, causing it to rest on the plane 5, with the base there of arranged between the front panel of the machine 1 and the locking element. This can be designed as a simple projection, molded on the upper grille of the rest plane 5, or as an inserted element or in any other manner.

The joint 49 can be designed so as to rotate around a nearly horizontal axis, to follow the downward orientation movement of the carafe. Alternatively the joint 49 can be formed in two pieces, mutually joined in such a manner that the distal part can slightly rotate, i.e. oscillate, downwards when it couples with the carafe.

FIGS. 25 and 26 show the initial phase and the final phase of the coupling movement.

The locking element 5A constitutes a block against the accidental removal of the carafe during the steam and/or hot water supply cycle, and represents therefore a greater safety for the user. The locking mechanism of the carafe is simple to be manufacture, efficient and reliable.

The carafe can be detached from the machine by means of a movement inverse to that described above.

In addition to or alternatively to the locking element 5A, a coupling can be provided, arranged on the front part of the machine, below the joint 49, which engages with a complementary element provided on the upper front part of the carafe.

It is understood that the drawing only shows an example provided by way of a practical embodiment of the present invention, which can vary in forms and arrangements without however departing from the scope of the concept underlying the invention. Any reference numbers in the appended claims are provided for the sole purpose of facilitating reading of the claims in the light of the description and the drawing, and do not limit the scope of protection represented by the claims in any manner.

The invention claimed is:

1. A coffee machine including a boiler for receiving and heating water to produce one of hot water and steam, the coffee machine comprising:
a plurality of circuits including first and second outlets, and a connection joint having first and second ducts coupled respectively to the first and second outlets;
an emulsifying device for heating and frothing milk and including a mixing nozzle, a suction chamber, and a block having a first inlet in fluid connection with the mixing nozzle and a second inlet in fluid connection with the mixing nozzle and the suction chamber; and
a connector configured to connect the first and second ducts of said connection joint to the first and second inlets of the block;
a third duct, arranged side-by-side to said first inlet, fluidically coupled to said suction chamber through said second inlet and said second duct for passage of hot water or steam towards said suction chamber;
a milk suction duct in flow connection with the mixing nozzle, wherein steam flowing from said first inlet forces milk through said milk suction duct and in to said mixing nozzle; and
a milk supply duct in flow connection to said mixing nozzle for supplying one of hot and frothed milk.

2. The coffee machine as claimed in claim 1, wherein said second inlet also passes air for frothing the milk, air and steam or hot water being fed alternatively in the suction chamber through said second outlet.

3. The coffee machine as claimed in claim 1, wherein said first and said second outlets exit in said connection joint.

4. The coffee machine as claimed in claim 3, wherein the supply of steam or hot water for washing the emulsifying device is enabled when the milk suction duct is at least partially closed.

5. The coffee machine as claimed in claim 3, wherein said first and said second outlets exit in distinct positions of said connection joint.

6. The coffee machine as claimed in claim 5, wherein the first outlet is configured to supply the steam in said mixing nozzle of the emulsifying device, and the second outlet is configured to supply the steam into said suction chamber of said emulsifying device.

7. The coffee machine as claimed in claim 1, wherein said circuits comprise a plurality of valves
to selectively control supply of the steam and hot water to said first outlet and to said second outlet to produce hot or frothed milk and, alternatively,
to carry out a washing cycle for washing said emulsifying device.

8. The coffee machine as claimed in claim 1, further comprising an air suction duct for suction of air towards said emulsifying device.

9. The coffee machine as claimed in claim 8, wherein said air suction duct includes a valve which allows selectively to open or to close said air suction duct.

10. The coffee machine as claimed in claim 8, wherein said air suction duct for suction of air towards said emulsifying device is in flow connection with a hot water or steam duct in flow connection with said second outlet.

11. The coffee machine as claimed in claim 1, wherein said circuits comprise:
a plurality of valves;
a feed duct for feeding hot water or steam to the plurality of valves;
a first supply duct for supplying hot water or steam from said plurality of valves to said first outlet;
a first valve for selectively controlling connection of said feed duct to said first supply duct;
a second supply duct for supplying hot water or steam from said plurality of valves to said second outlet; and
a second valve for selectively controlling connection of said feed duct to said second supply duct.

12. The coffee machine as claimed in claim 11, further comprising a third valve for selectively controlling connection of said feed duct to a third supply duct in flow connection with a nozzle for supplying water or steam, separate from said first and second outlet.

13. The coffee machine as claimed in claim 11, further comprising an air suction hole and a fourth valve for selectively controlling connection of the air suction hole and a duct for the supply of air towards said second outlet.

14. The coffee machine as claimed in claim 13, wherein said air supply duct exits in one of
a position adjacent to said second outlet and
a duct for conveying water or steam towards said second outlet.

15. The coffee machine as claimed in claim 1, further comprising an electronic control unit, which controls the supply of hot water or steam through one of said first and said second outlet.

16. The coffee machine as claimed in claim 15, further comprising a first microswitch and a second microswitch, to enable the supply of hot water or steam from one of the first outlet and the second outlet based upon the presence and the position of said emulsifying device interfaced with said connection joint.

17. The coffee machine as claimed in claim 1, further comprising a programmable control unit and wherein said control unit controls carrying out of washing cycles of the emulsifying device by one of supplying one of hot water and steam through said second outlet and in sequence through said second outlet and subsequently both the hot water and steam through said first outlet and said second outlet or vice versa.

18. The coffee machine as claimed in claim 17, wherein said programmable control unit is programmed for automatically performing a washing cycle at an end of a milk supply cycle.

19. The coffee machine as claimed in claim 17, wherein at least during a part of each of the washing cycles said steam or hot water is supplied in conditions appropriate to generate an overpressure in said milk suction duct connected to said emulsifying device.

20. The coffee machine as claimed in claim 19, wherein said emulsifying device includes:
a first element for actuating a microswitch to enable the supply of hot water or steam for frothing or heating the milk; and a second element for actuating a microswitch associated to the coffee machine, in order to enable the supply of steam or hot water for washing the emulsifying device.

21. The coffee machine as claimed in claim 1, wherein said connector includes:
a seat for the insertion of said connection joint of the coffee machine having said first inlet towards the mixing nozzle, said third duct extending between said seat and said suction chamber.

22. The coffee machine as claimed in claim 1, wherein said emulsifying device is constrained to a carafe for containing milk to be heated or frothed.

23. The coffee machine as claimed in claim 1, wherein said emulsifying device comprises a body in which said connector, said mixing nozzle and said suction chamber are arranged, and to which an opening and closing member for closing and opening at least partially the milk suction duct is movably constraint, which said opening and closing member can assume, with respect to said body, at least a first position of closing said milk suction duct and a second position for opening the milk suction duct.

24. The coffee machine as claimed in claim 23, wherein said opening and closing member is provided with a rotatory movement relative to said body.

25. The coffee machine as claimed in claim 23, wherein said milk suction duct comprises a tube made of flexible material and in that said opening and closing member is arranged and designed so as to at least partially throttle said flexible tube thus hindering flow through said milk suction duct when the opening and closing member is in closing position.

26. The coffee machine as claimed in claim 23, wherein said milk supply duct for supplying hot or frothed milk is carried by said opening and closing member and is in fluid connection with the outlet of the mixing nozzle housed inside the body of the emulsifying device.

27. The coffee machine as claimed in claim 23, wherein said milk supply duct takes at least two different positions corresponding to the closing position and to the opening position of said opening and closing member.

28. The coffee machine as claimed in claim 23, wherein said opening and closing member is arranged and designed so as to take a plurality of intermediate positions between said opening position and said closing position, in said intermediate positions the milk suction duct being partially throttled in order to reduce the section of passage and the flow of sucked milk.

29. The coffee machine as claimed in claim 23, wherein when the opening and closing member is in a position for closing the milk suction duct, the milk supply duct is connectable to a handle of a carafe, said handle forming a fluid passage for the discharge of washing steam and water for washing the emulsifying device, said milk supply duct of the emulsifying device being positionable in flow connection with said fluid passage formed in said handle of the carafe.

30. The coffee machine as claimed in claim 1, wherein said emulsifying device is connectable to a lid of a carafe for containing the milk, the milk suction duct extending inside the carafe and the milk supply duct extending outside the carafe.

31. The coffee machine as claimed in claim 1, further comprising a coffee brewing unit;
a water tank;
first and second pumps connected to the water tank; and
a second boiler,
wherein
the first pump is connected to the boiler for pumping water from the water tank to the boiler, and
the second pump is connected to the second boiler for pumping water from the water tank to the second boiler.

* * * * *